(12) United States Patent
Watanabe et al.

(10) Patent No.: US 12,305,679 B2
(45) Date of Patent: May 20, 2025

(54) SCREW NAIL

(71) Applicant: MAX CO., LTD., Tokyo (JP)

(72) Inventors: Eiichi Watanabe, Tokyo (JP); Ryuta Kurasawa, Tokyo (JP)

(73) Assignee: Max Co., Ltd., Tokyo (JP)

( * ) Notice: Subject to any disclaimer, the term of this patent is extended or adjusted under 35 U.S.C. 154(b) by 122 days.

(21) Appl. No.: 18/094,641

(22) Filed: Jan. 9, 2023

(65) Prior Publication Data
US 2023/0220865 A1    Jul. 13, 2023

(30) Foreign Application Priority Data

Jan. 13, 2022   (JP) ................................. 2022-003587

(51) Int. Cl.
*F16B 35/00*   (2006.01)
*F16B 15/02*   (2006.01)
*F16B 15/06*   (2006.01)

(52) U.S. Cl.
CPC .............. *F16B 15/02* (2013.01); *F16B 15/06* (2013.01)

(58) Field of Classification Search
CPC ................................ F16B 19/06; F16B 15/02
USPC .......................................... 411/402, 403, 481
See application file for complete search history.

(56) References Cited

U.S. PATENT DOCUMENTS

| | | | | |
|---|---|---|---|---|
| 3,088,361 A | * | 5/1963 | Hallock | .................. F16B 15/02 52/363 |
| 3,302,672 A | * | 2/1967 | Walton | ................. B25B 15/004 81/461 |
| 3,331,274 A | * | 7/1967 | Walton | ................ F16B 23/0076 411/910 |
| 4,911,593 A | * | 3/1990 | Kephart | .............. F16B 23/0038 411/407 |
| 7,425,112 B2 | * | 9/2008 | Nowak, Jr. | ......... F16B 23/0069 411/910 |

(Continued)

FOREIGN PATENT DOCUMENTS

| | | |
|---|---|---|
| CN | 112762076 A | 5/2021 |
| JP | S53-037870 U | 4/1978 |

(Continued)

OTHER PUBLICATIONS

Nov. 10, 2023—(JP) Notification of JP Information Offer by Third Party.

(Continued)

*Primary Examiner* — Flemming Saether
(74) *Attorney, Agent, or Firm* — Banner & Witcoff, Ltd.

(57) ABSTRACT

A screw nail includes a nail shaft portion extending along one direction, and a head portion whose diameter is enlarged along other direction orthogonal to an extension direction. A sharp tip end portion is formed on one end side of the nail shaft portion, and the head portion is formed at an end portion on the other end side. The nail shaft portion is formed with a screw thread, and the head portion is formed with an engaging portion capable of engaging with a rotary tool. A convex portion protruding along an axis direction of the nail shaft portion is formed on an end surface of the head portion. A concave portion that is concave with respect to the convex portion is formed between the convex portion and the engaging portion. A virtual plane specified by vertexes of the convex portion is a plane orthogonal to the axis direction.

8 Claims, 34 Drawing Sheets

(56) References Cited

U.S. PATENT DOCUMENTS

| | | | | |
|---|---|---|---|---|
| 7,997,404 | B2* | 8/2011 | Krisl | B65G 17/40 |
| | | | | 198/779 |
| 10,076,373 | B2 | 9/2018 | Strnad et al. | |
| 2010/0111641 | A1* | 5/2010 | Zoller | F16B 23/0053 |
| | | | | 81/460 |
| 2010/0202854 | A1* | 8/2010 | Largo | F16B 15/02 |
| | | | | 411/439 |
| 2013/0014910 | A1* | 1/2013 | Zhu | F16B 5/0266 |
| | | | | 411/407 |
| 2016/0252125 | A1* | 9/2016 | Lares | B21J 5/08 |
| | | | | 411/402 |
| 2018/0017092 | A1* | 1/2018 | Hasegawa | F16B 35/065 |
| 2018/0238368 | A1* | 8/2018 | Ryan | F16B 15/02 |
| 2021/0172468 | A1 | 6/2021 | Richard | |

FOREIGN PATENT DOCUMENTS

| | | |
|---|---|---|
| JP | S55-137709 U | 10/1980 |
| JP | H06-03563 U | 5/1994 |
| JP | H06-035630 U | 5/1994 |
| JP | H06-065610 U | 9/1994 |
| JP | H10-227305 A | 8/1998 |
| JP | 2004-308722 A | 11/2004 |
| JP | 4144408 B2 | 9/2008 |
| JP | 2010-054015 A | 3/2010 |
| JP | 2017-155790 A | 9/2017 |

OTHER PUBLICATIONS

Dec. 18, 2023—(JP) Notification of Information Offer by Third Party.

Extended European Search Report dated May 16, 2023, issued by the European Patent Office in the corresponding European Patent Application No. 23151245.0. (12 pages).

* cited by examiner

SCREW NAIL

CROSS-REFERENCE TO RELATED APPLICATIONS

The present application claims priority from Japanese Patent Application No. 2022-003587 filed on Jan. 13, 2022, the entire content of which is incorporated herein by reference.

TECHNICAL FIELD

The present invention relates to a screw nail that is used for fastening steel plates, or the like.

BACKGROUND ART

"Screws" that can be re-tightened or removed are often used to fasten steel plates that are used in roof construction or the like. However, construction with screws requires drilling prepared holes or screwing while cutting a tap, resulting in poor workability.

As a solution to such problem, a screw nail capable of being struck with a tool configured to operate by a motor, an air pressure, a combustion pressure of gas, or the like and being pulled out by rotating the screw nail like a "screw" upon pullout has been suggested.

When using a screw nail to fasten steel plates, it is necessarily required to transmit high torque. Therefore, a screw nail having a "square hole or hexagon hole recess" or a "hexagon head" with excellent torque transmission, instead of a "cross groove recess", is used.

A "square hole" or "hexagon hole" recess suitable for transmission of high torque has a feature that a clearance between a bit and the recess is smaller than that of the "cross groove" recess. However, for the screw nail, there is a problem that the recess may be deformed due to impact at the time of striking, and therefore, the bit does not fit into the recess.

Accordingly, a technology of forming an annular protrusion serving as a crushing margin on an outer periphery of a head portion of a screw nail has been suggested (refer to Japanese Patent No. 4,144,408, for example). In addition, a screw having a protrusion formed on an upper surface of a head portion has been suggested for the purpose of aligning a direction of a recess (refer to Japanese Unexamined Utility Model Application Publication No. H06-35630, for example).

SUMMARY OF INVENTION

However, in the configuration in which the annular protrusion is provided on the outer periphery of the head portion, the protrusion is crushed upon striking and spreads outward of the head portion, resulting in a larger head diameter and a poor appearance. In addition, when the crushed protrusion sticks out in a form of burr outward from the outer periphery of the head portion, the protrusion may come into contact with a surrounding member or the like and exert an influence. Further, in the case of a screw nail having a "hexagon head", as a diameter of the head increases, a socket does not enter, and therefore, the screw nail cannot be loosened. Further, if a screw having one or two protrusions provided on the upper surface of the head portion is used as a screw nail, when the screw nail and an axis of a screwdriver are misaligned, a striking surface of the screwdriver strikes only a part of the head portion of the screw nail, so that a striking force cannot be transmitted in an axis direction, and therefore, the screw nail may be tilted.

The present invention has been made in view of the above problems, and an object thereof is to provide a screw nail capable of suppressing tilting upon striking while suppressing an influence of deformation due to striking.

According to the present invention, there is provided a screw nail including a nail shaft portion extending along one direction, and a head portion. The diameter of the head portion is enlarged along other direction orthogonal to an extension direction of the nail shaft portion. A sharp tip end portion is formed on one end side of the nail shaft portion along the extension direction, and the head portion is formed at an end portion on the other end side. The nail shaft portion is formed with a screw thread between the tip end portion and the head portion, and the head portion is formed with an engaging portion capable of engaging with a rotary tool. A convex portion protruding along an axis direction of the nail shaft portion is formed on an end surface of the head portion on an opposite side to a side from which the nail shaft portion protrudes. A concave portion that is concave with respect to the convex portion along the axis direction of the nail shaft portion is formed between the convex portion and the engaging portion. A virtual plane specified by vertexes of the convex portion is a plane orthogonal to the axis direction of the nail shaft portion.

In the present invention, the concave portion is formed between the convex portion that is struck by the striking tool and the engaging portion. Therefore, even when the convex portion is deformed by striking, a factor of hindering engagement between the rotary tool configured to rotate the screw nail and the engaging portion of the screw nail is excluded. In addition, the virtual plane specified by the vertex of the convex portion is orthogonal to the axis direction of the nail shaft portion, whereby a striking force is transmitted to the axis direction of the screw nail.

According to the present invention, it is possible to suppress an influence of deformation of the convex portion formed on the head portion of the screw nail due to the striking, and to maintain a state in which the rotary tool configured to rotate the screw nail and the engaging portion of the screw nail can be engaged. In addition, it is possible to suppress the screw nail from being tilted upon striking.

DESCRIPTION OF EMBODIMENTS

Hereinafter, embodiments of the screw nail of the present invention will be described with reference to the drawings.

Configuration Example of Screw Nail of Present Embodiment

Figure 1A:
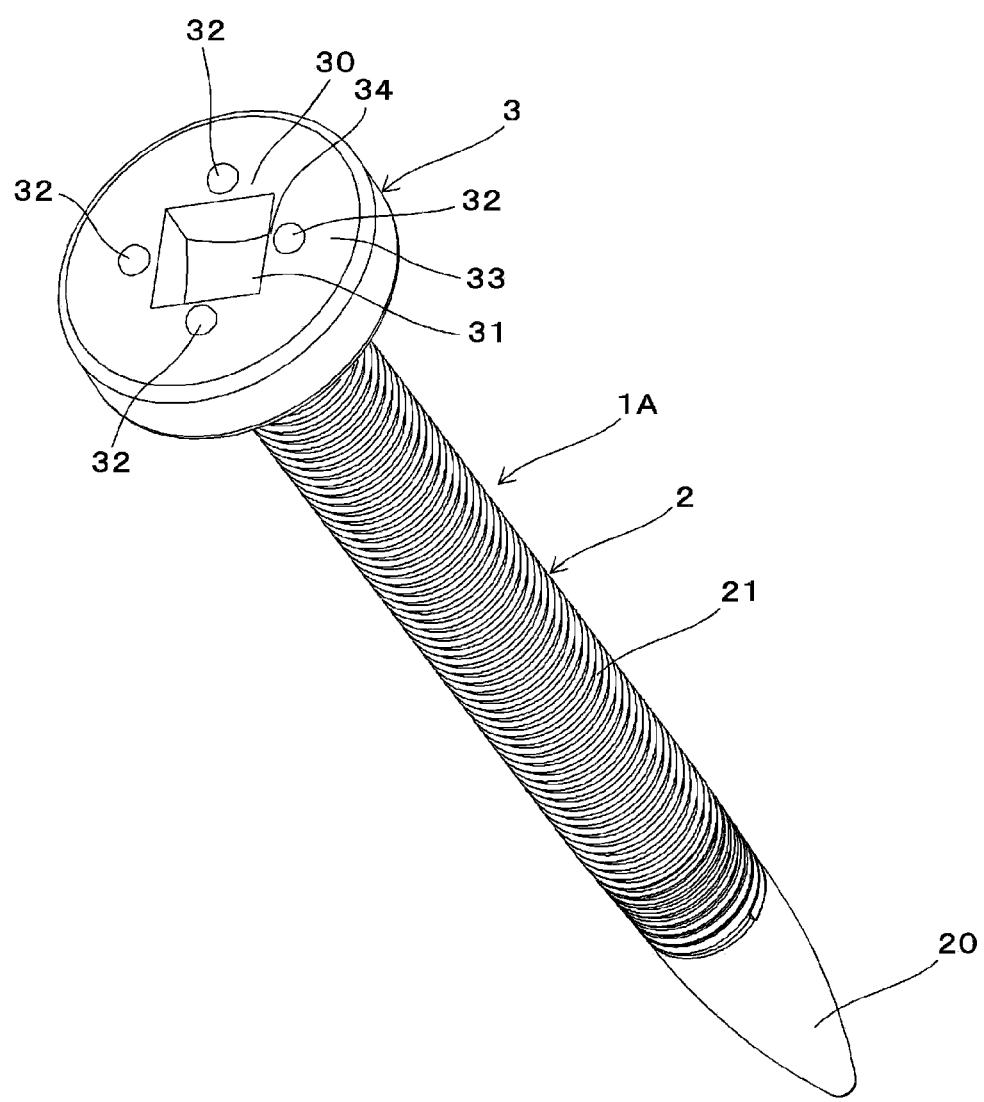
FIG. 1A is a perspective view showing an example of a screw nail according to a first embodiment.
Figure 1B:
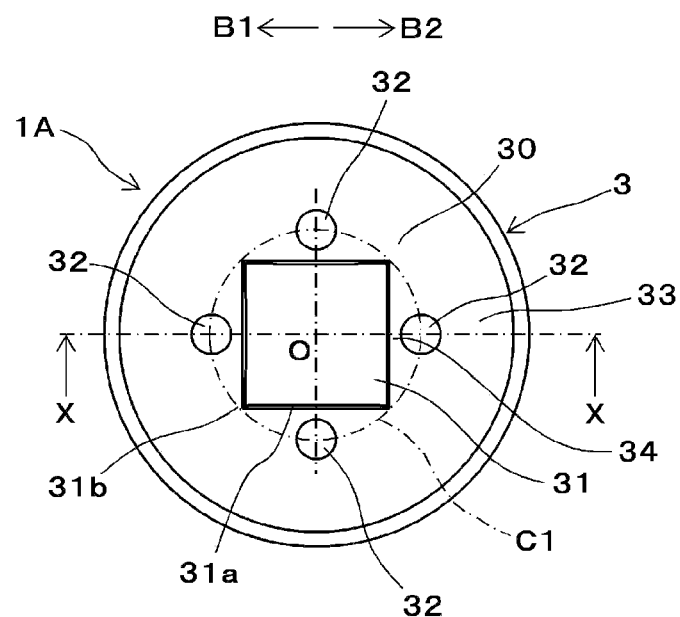
FIG. 1B is a plan view showing the example of the screw nail according to the first embodiment.
Figure 1C:
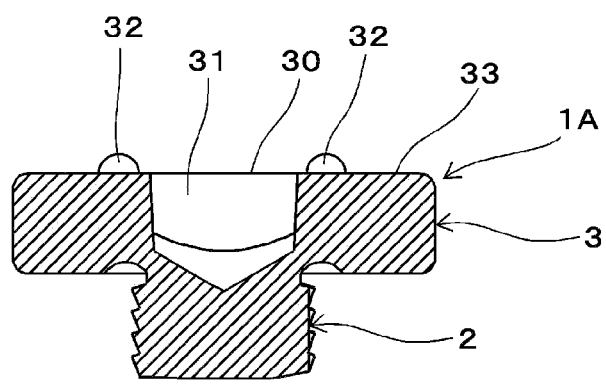
FIG. 1C is a cross-sectional view taken along an X-X line in FIG. 1B.
Figure 1D:
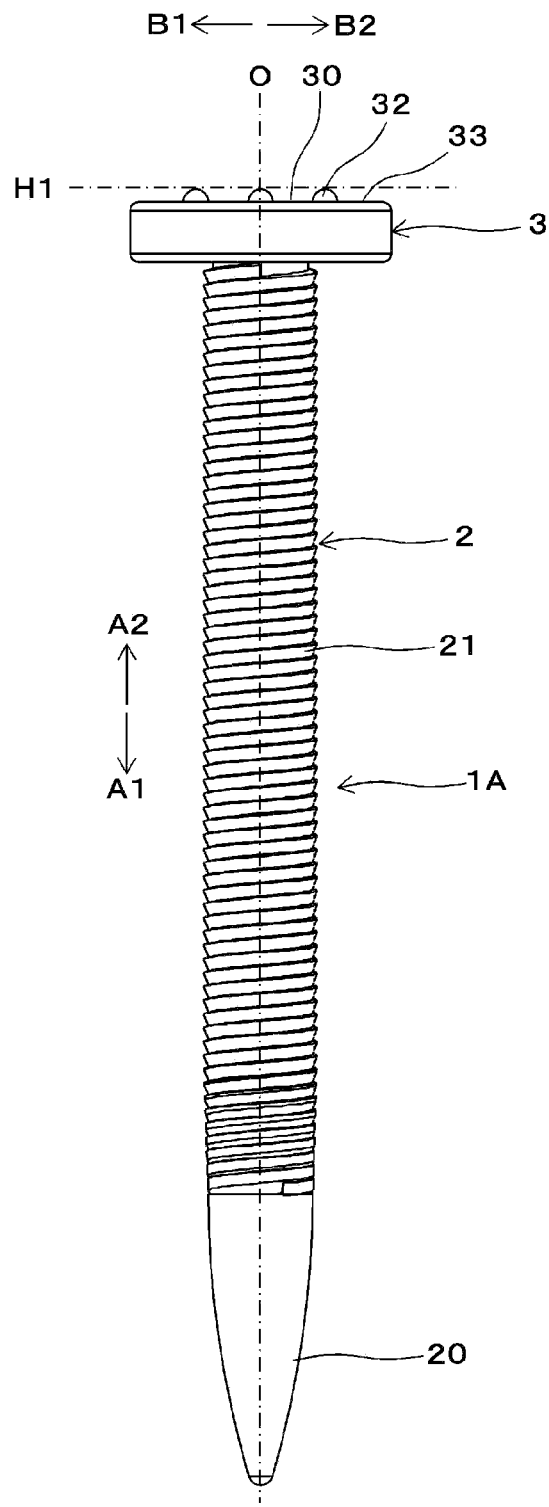
FIG. 1D is a side view showing the example of the screw nail according to the first embodiment.

FIG. 1A is a perspective view showing an example of a screw nail according to a first embodiment, FIG. 1B is a plan view showing the example of the screw nail according to the first embodiment, FIG. 1C is a cross-sectional view taken along an X-X line in FIG. 1B, and FIG. 1D is a side view showing the example of the screw nail according to the first embodiment.

A screw nail 1A includes a nail shaft portion 2 extending along one direction indicated by arrows A1 and A2, and a head portion 3 having a diameter enlarged along other direction indicated by arrows B1 and B2 orthogonal to the extension direction of the nail shaft portion 2 with respect to the nail shaft portion 2.

The screw nail 1A is formed with a tip end portion 20 on one end side indicated by the arrow A1 along the extension direction of the nail shaft portion 2. The tip end portion 20 has an end portion provided on one end side of the nail shaft portion 2 and formed into a sharp shape capable of being struck into a fastening target.

In addition, the screw nail 1A is formed with the head portion 3 at an end portion on the other end side indicated by the arrow A2 along the extension direction of the nail shaft portion 2. Further, the screw nail 1A has a screw thread 21 formed at the nail shaft portion 2 along the extension direction of the nail shaft portion 2 between the tip end portion 20 and the head portion 3.

The screw nail 1A has an engaging portion 31 formed on an end face 30 of the head portion 3 on an opposite side to a side from which the nail shaft portion 2 protrudes and capable of engaging with a rotary tool (not shown). The engaging portion 31 is configured as a hole having a predetermined shape in which an opening having at least three vertexes is exposed on the end face 30 of the head portion 3. In the case in which a bit (not shown) as a rotary tool has a square cross-sectional shape, the engaging portion 31 is configured by providing a square hole as an opening exposed on the end surface 30. The engaging portion 31 formed by providing the end face 30 of the head portion 3 with a hole having a predetermined shape adapted to the rotary tool in this way is referred to as a recess.

The screw nail 1A has a convex portion 32 provided on the end face 30 of the head portion 3 and protruding along an axis direction of the nail shaft portion 2 in a direction opposite to a direction in which the nail shaft portion 2 protrudes from the head portion 3. The screw nail 1A has at least three convex portions 32 formed on the end face 30 of the head portion 3. The three or more convex portions 32 are formed at equal intervals along a circumferential direction of the head portion 3 on a concentric circle centered on a rotational axis O of the screw nail 1A.

Thereby, on the end face 30 of the head portion 3, at least one convex portion 32 is located on one of half regions divided by an arbitrary center line, and the remaining convex portions 32 are located on the other of the half regions. The arbitrary center line may be a line passing through a center of the head portion 3. Therefore, the convex portions 32 come into contact with a striking tool configured to strike the head portion of the screw nail 1A in each of the half regions divided by the arbitrary center line on the end face 30 of the head portion 3.

Therefore, in an operation of striking the head portion 3 of the screw nail 1A with a striking tool, the striking tool strikes each convex portion 32, whereby a striking force can be transmitted in the axis direction of the screw nail 1A.

In the example shown in FIGS. 1A, 1B, 1C and 1D, the screw nail 1A has the four convex portions 32 formed on the end face 30 of the head portion 3. The four convex portions 32 are formed at equal intervals along the circumferential direction of the head portion 3 on the concentric circle centered on the rotational axis O of the screw nail 1A.

The screw nail 1A has a concave portion 33, which is concave with respect to the convex portion 32 along the axis direction of the nail shaft portion 2 and is formed outside each convex portion 32 with respect to a radial direction of the head portion 3 along the other direction indicated by the arrows B1 and B2 orthogonal to the extension direction of the nail shaft portion 2. In addition, a concave portion 34 concave with respect to the convex portions 32 along the axis direction of the nail shaft portion 2 is formed inside each convex portion 32. In a configuration of the screw nail 1A in which the end face 30 of the head portion 3 is drilled to form the engaging portion 31, the concave portion 33 and the concave portion 34 are formed by the same surface connecting to the end face 30, and are portions of the end face 30. Further, in the configuration of the screw nail 1A in which the end face 30 of the head portion 3 is drilled to form the engaging portion 31, the concave portion 34 is formed between the convex portion 32 and the engaging portion 31.

As shown in FIG. 1B and the like, in the case in which the engaging portion 31 is a hole formed in the end face 30 of the head portion 3 and an opening exposed on the end face 30 has a square shape, the four convex portions 32 are provided at positions facing each side 311*a* of the square shape.

Thereby, as compared with a configuration in which the four convex portions 32 are provided at positions facing vertexes 31*b* of the square shape, each convex portion 32 can be located on a circumcircle C1 passing through each vertex 31*b* of the engaging portion 31 while securing a dimension of the concave portion 34 between the engaging portion 31 and the convex portion 32, and the convex portion 32 can be arranged close to a center of the head portion 3 in the radial direction. In addition, a dimension of the concave portion 33 between an outer periphery of the head portion 3 and the convex portion 32 can be secured.

Therefore, even when the convex portions 32 formed on the head portion 3 of the screw nail 1A are deformed by being struck with the striking tool, since the concave portion 34 is formed between the convex portions 32 and the engaging portion 31, the engaging portion 31 is suppressed from being deformed, and a state in which the rotary tool (bit) configured to rotate the screw nail 1A and the engaging portion 31 of the screw nail 1A can be engaged can be maintained.

Note that, in the case in which the engaging portion 31 is a hole formed in the end face 30 of the head portion 3 and the opening exposed on the end face 30 has a square shape, the four convex portions 32 may be provided at positions facing each vertex 31*b* of the square shape. In this case, each convex portion 32 is positioned outside the circumcircle C1 passing through each vertex 31*b* of the engaging portion 31.

Figure 2A:
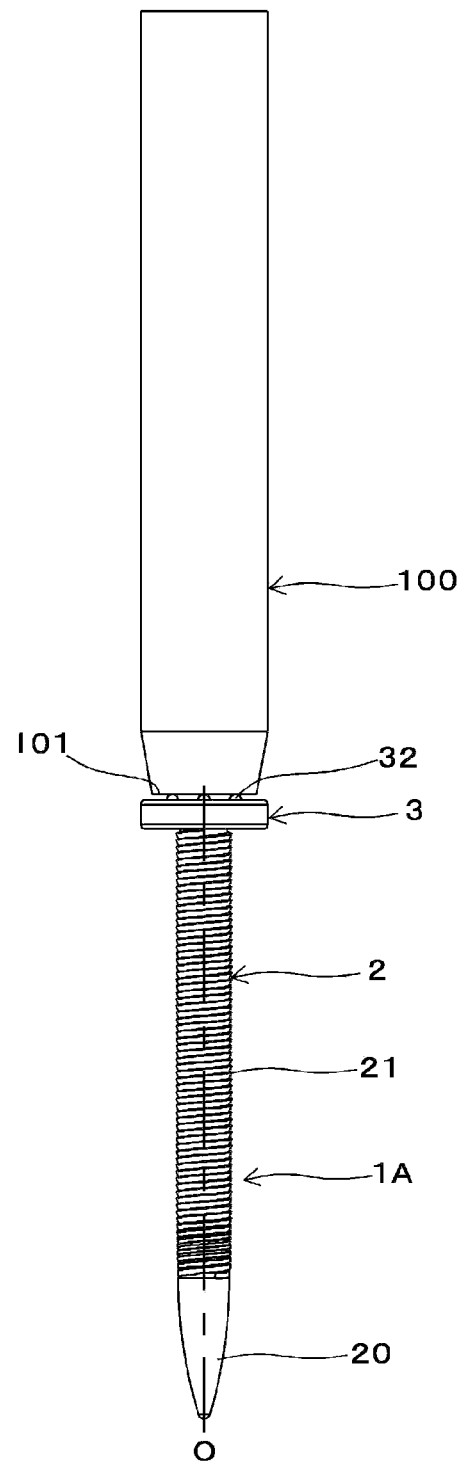
FIG. 2A illustrates a relationship between a screwdriver configured to strike a screw nail and a screw nail.

FIGS. 2A, 2B, 2C, 2D and 2E illustrate a relationship between a screwdriver configured to strike a screw nail and a screw nail. As a striking tool configured to strike the end face 30 of the head portion 3, a tool configured to actuate a screwdriver 100 as shown in FIG. 2A, which is configured to strike the end face 30 of the head portion 3 of the screw nail 1A, by a motor, an air pressure, a combustion pressure of gas, or the like is known. In such a tool, since the screwdriver 100 passes through a passage through which the screw nail 1A is struck out, a diameter of the screwdriver 100 is about equal to or less than a diameter of the head portion 3, and a diameter of a striking surface 101 of the screwdriver 100 is smaller than a diameter of the end face 30 of the head portion 3.

Figure 2B:
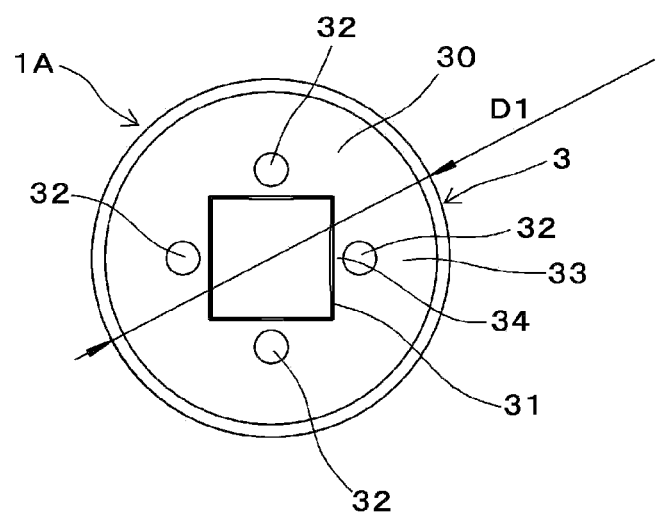
FIG. 2B illustrates a relationship between the screwdriver configured to strike a screw nail and the screw nail.
Figure 2C:
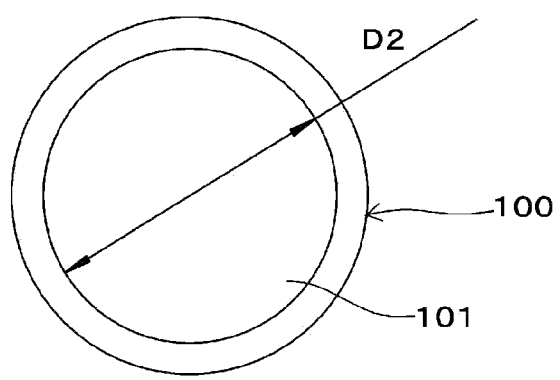
FIG. 2C illustrates a relationship between the screwdriver configured to strike a screw nail and the screw nail.

As shown in FIG. 2B, for a tool using the screw nail 1A whose diameter D1 of the end face 30 of the head portion 3 is about 8.5 mm, a diameter D2 of the striking surface 101 of the screwdriver 100 is about 7 mm, as shown in FIG. 2C. For this reason, when an area of the end face 30 of the head portion 3 is assumed as 100%, an area of the striking surface of the screwdriver 100 is about 68%.

Figure 2D:
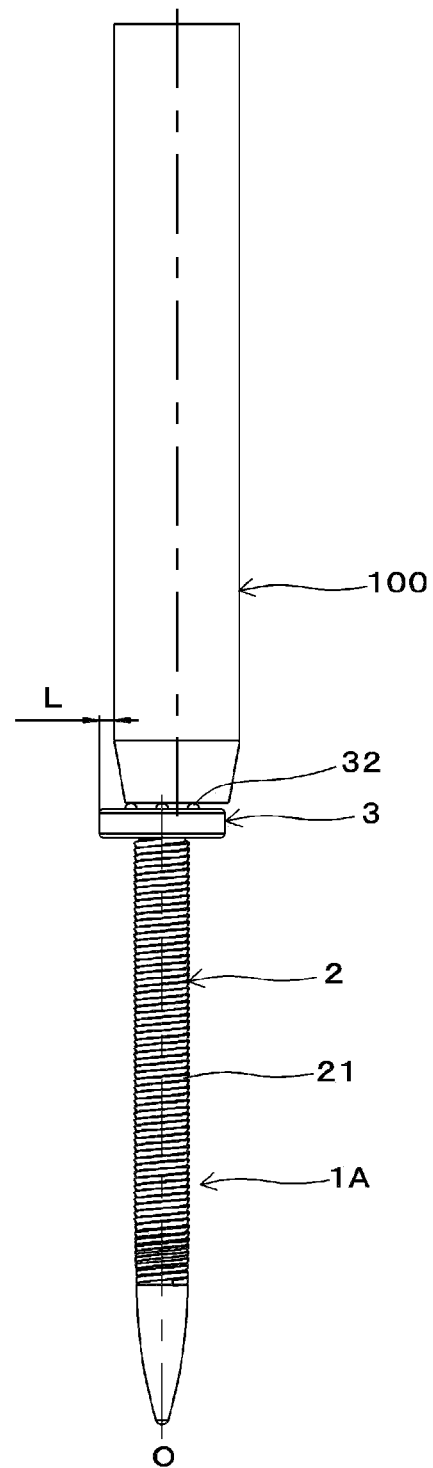
FIG. 2D illustrates a relationship between the screwdriver configured to strike a screw nail and the screw nail.

Further, as shown in FIG. 2D, in a tool passage (not shown) through which the screw nail 1A and the screwdriver 100 pass, a relative movable amount L between the screw nail 1A and the screwdriver 100 along the radial direction of the head portion 3 is about 1 mm.

Figure 2E:
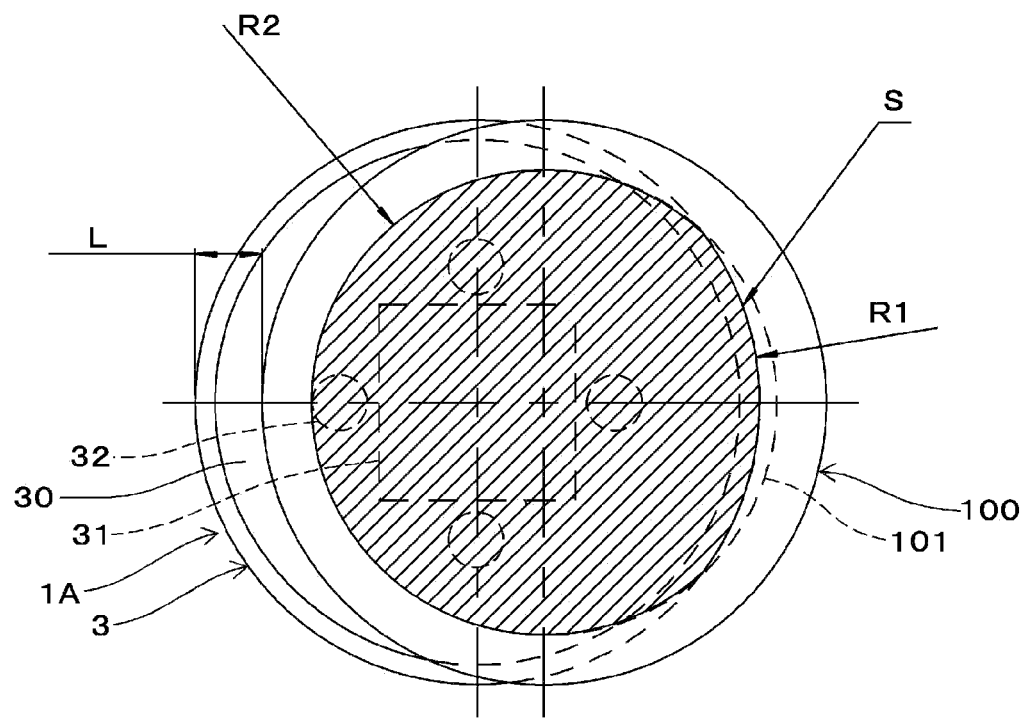
FIG. 2E illustrates a relationship between the screwdriver configured to strike a screw nail and the screw nail.

Thereby, as shown in FIG. 2E, when the screw nail 1A and the screwdriver 100 relatively move by the maximum movable amount L along the radial direction of the head portion 3, an overlapping area S of the end face 30 of the head portion 3 and the striking surface 101 of the screwdriver 100 is about 66%.

Since the concave portion 33 is formed outside each convex portion 32 with respect to the radial direction of the head portion 3, when the area of the end face 30 of the head portion 3 is assumed as 100%, each convex portion 32 and the striking surface 101 of the screwdriver 100 come into contact with each other in the case of a configuration in which three or more convex portions 32 are located within a range of an area equal to or less than 64% of the area of the end face 30 and outside the engaging portion 31.

Thereby, as shown in FIG. 2D, even when the screw nail 1A and the screwdriver 100 relatively move by the maximum movable amount L along the radial direction of the head portion 3, in the operation of striking the head portion 3 of the screw nail 1A with the screwdriver 100, the screwdriver 100 strikes each convex portion 32, whereby the striking force can be transmitted in the axis direction of the screw nail 1A.

Note that, for the screw nail 1A whose diameter D1 of the end face 30 of the head portion 3 is about 8.5 mm, a diameter of the circumcircle C1 passing through each vertex 31*b* of the engaging portion 31 is about 4.2 mm. For this reason, in the case in which the diameter D2 of the striking surface 101 of the screwdriver 100 is about 7 mm, when the convex portions 32 are formed within a circle having a diameter of 4.2 mm or more and 7 mm or less from the center of the head portion 3, each convex portion 32 and the striking surface 101 of the screwdriver 100 come into contact with each other.

Note that, in the case in which the striking tool configured to strike the end face 30 of the head portion 3 is a hammer that strikes the screw nail 1A with a force of the hand, a diameter of a striking surface of the hammer is generally greater than the diameter of the head portion 3. Thereby, in an operation of striking the head portion 3 of the screw nail 1A with a hammer, each convex portion 32 and the striking surface of the hammer come into contact with each other.

Further, in the case of a tool configured to actuate the screwdriver 100 for striking the end surface 30 of the head portion 3 with a motor, an air pressure, a combustion pressure of gas, or the like, a force with which the screwdriver 100 strikes the convex portions 32 of the head portion 3 is about 1500 N or more and 3000 N or less. Therefore, protrusion heights of the convex portions 32 from the end surface 30 are set to 0.5 mm or more and 1.5 mm or less. Note that, when using a hammer whose weight of a striking part is about 400 g, it is considered that a striking force of about 500 N is generated.

Thereby, when the protrusion heights of the convex portions 32 from the end surface 30 are set to 0.5 mm or more and 1.5 mm or less, the striking tool does not directly strike the end surface 30 of the head portion 3, so that the engaging portion 31 or an external appearance of the head portion is suppressed from being deformed. In addition, since the convex portions 32 are arranged on the inner side spaced from the outer periphery of the head portion 3 by a predetermined amount, even when the convex portions 32 are crushed and deformed, the crushed convex portions 32 are suppressed from sticking out in a form of burr outward from the outer periphery of the head portion 3. Therefore, occurrence of a poor appearance in which the burr-shaped crushed convex portions 32 stick out outward from the outer periphery of the head portion 3 is suppressed, and the crushed convex portions 32 sticking out in a burr shape are suppressed from affecting a surrounding member, and the like.

Further, in the screw nail 1A, the height of each convex portion 32 from the end face 30 is set so that a virtual plane H1 tangent to the vertexes of the three or more convex portions 32, which is a virtual plane specified by the vertexes of the convex portions 32, is orthogonal to the axis O of the screw nail 1A. Thereby, in the operation of striking the head portion 3 of the screw nail 1A with the striking tool, the striking tool strikes each convex portion 32, whereby the striking force can be transmitted in the axis direction of the screw nail 1A.

Modified Embodiments of Screw Nail of Present Embodiment

Figure 3A:
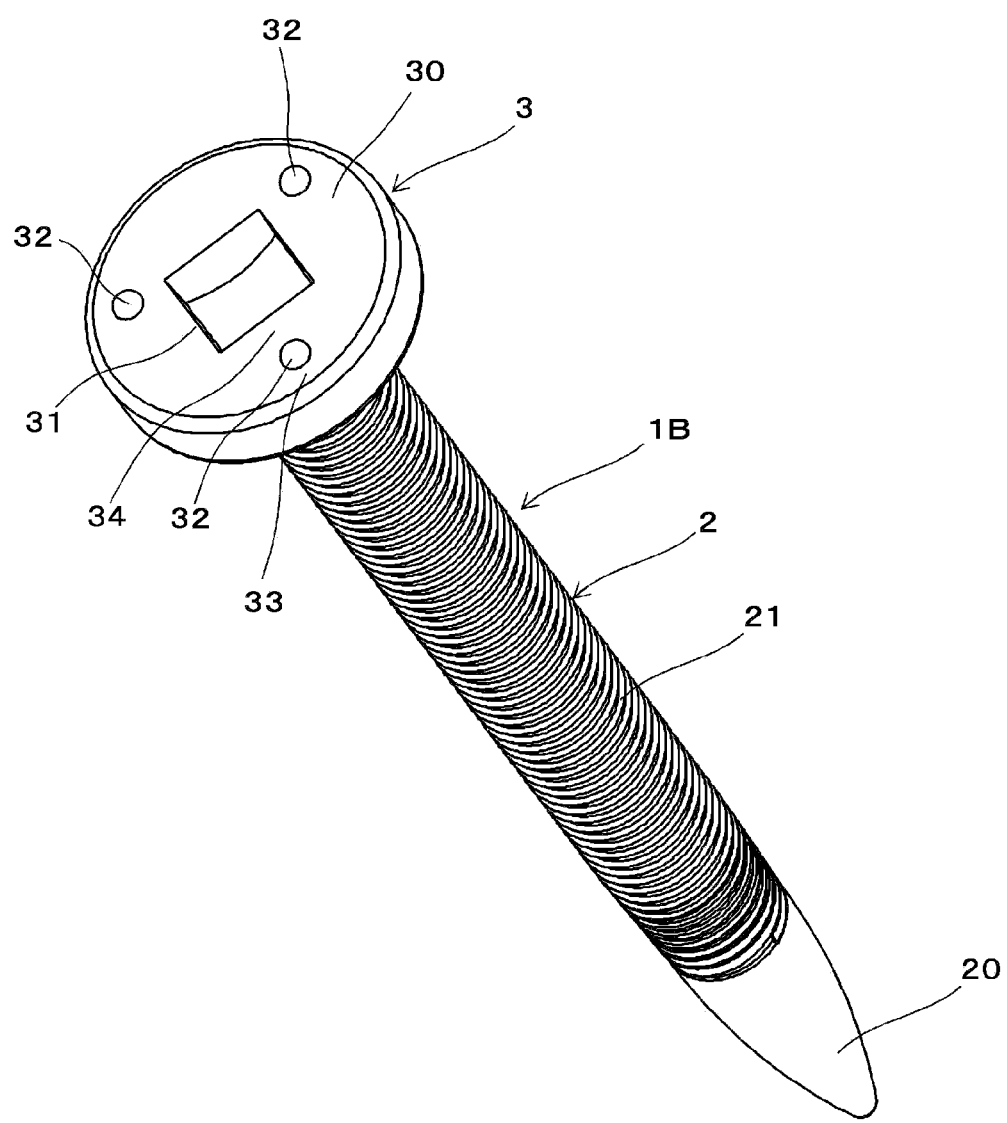
FIG. 3A is a perspective view showing an example of a screw nail according to a second embodiment.
Figure 3B:
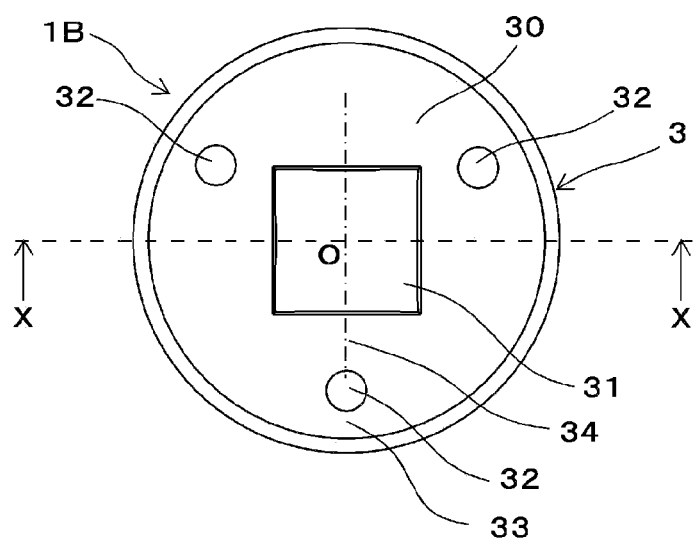
FIG. 3B is a plan view showing the example of the screw nail according to the second embodiment.
Figure 3C:
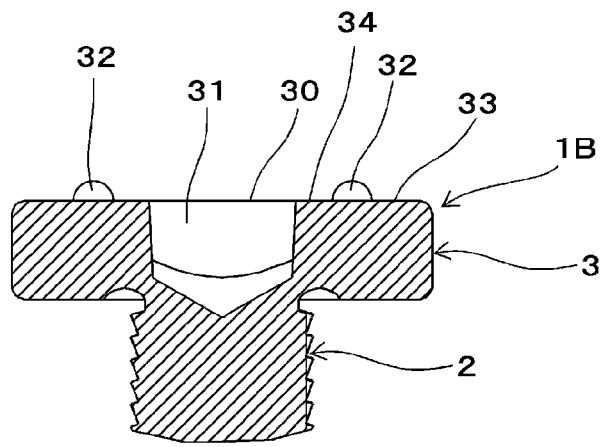
FIG. 3C is a cross-sectional view taken along an X-X line in FIG. 3B.
Figure 3D:
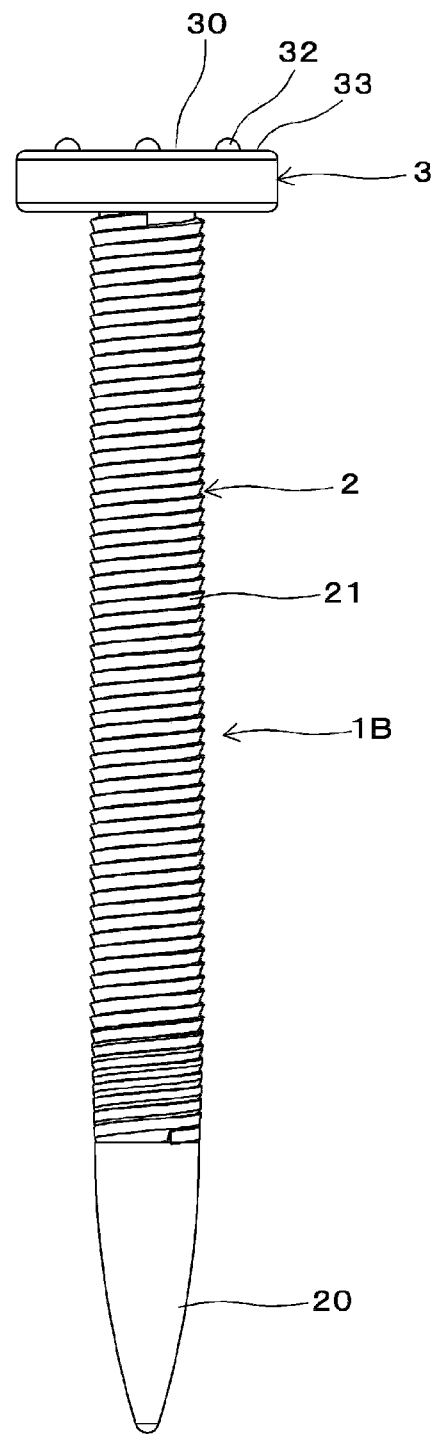
FIG. 3D is a side view showing the example of the screw nail according to the second embodiment.

FIG. 3A is a perspective view showing an example of a screw nail according to a second embodiment, FIG. 3B is a plan view showing the example of the screw nail according to the second embodiment, FIG. 3C is a cross-sectional view taken along an X-X line in FIG. 3B, and FIG. 3D is a side view showing the example of the screw nail according to the second embodiment.

A screw nail 1B has three convex portions 32 formed on the end face 30 of the head portion 3. The three convex portions 32 are formed at equal intervals along the circumferential direction of the head portion 3 on a concentric circle centered on a rotational axis O of the screw nail 1B. Note that, the number of the convex portions 32 may also be four or more.

Figure 4A:
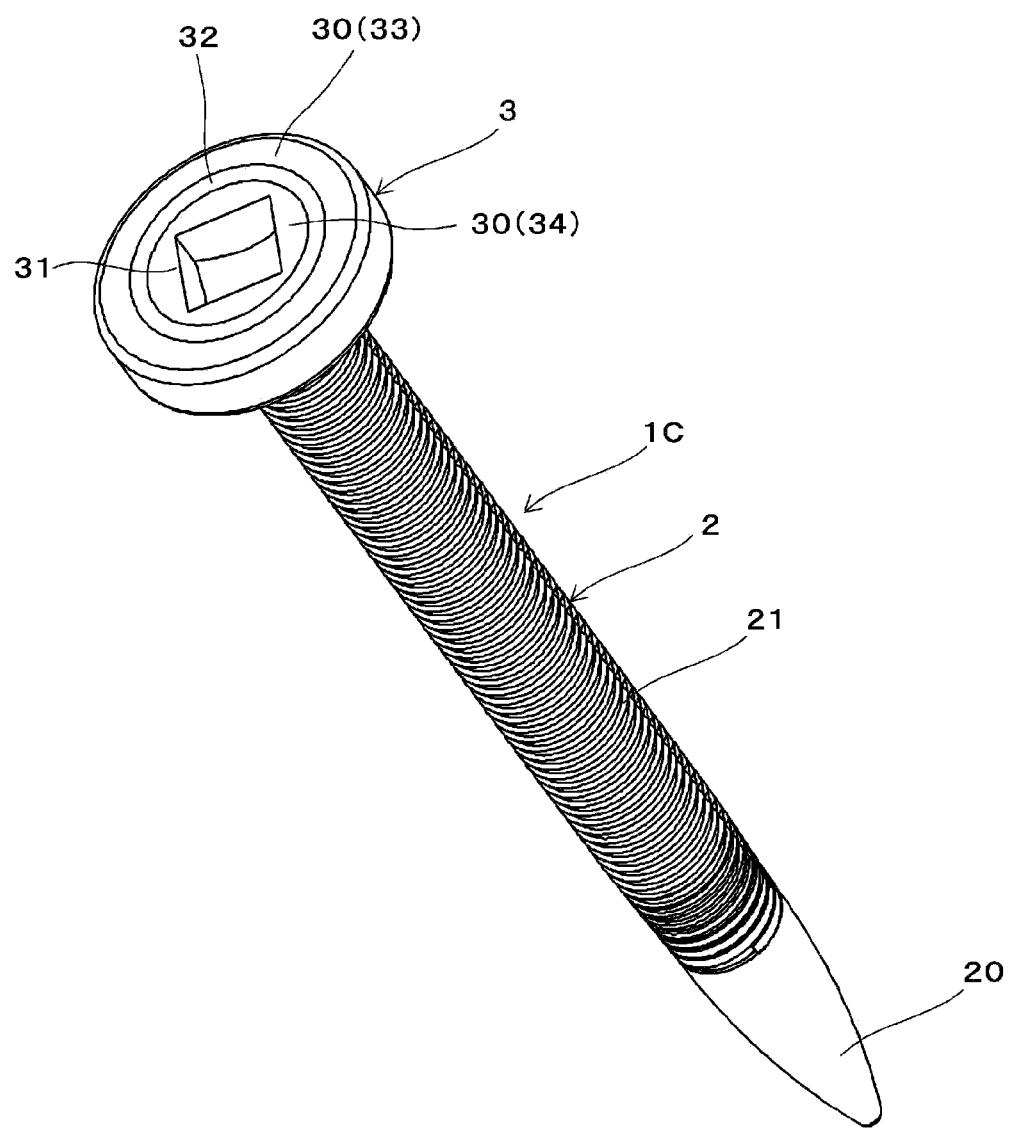
FIG. 4A is a perspective view showing an example of a screw nail according to a third embodiment.
Figure 4B:
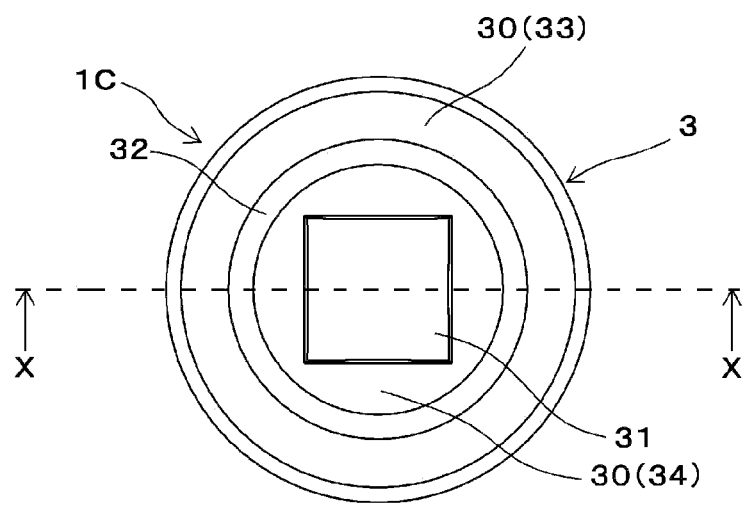
FIG. 4B is a plan view showing the example of the screw nail according to the third embodiment.
Figure 4C:
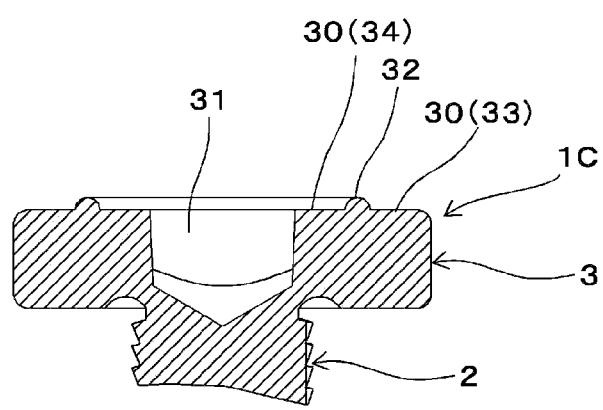
FIG. 4C is a cross-sectional view taken along an X-X line in FIG. 4B.
Figure 4D:
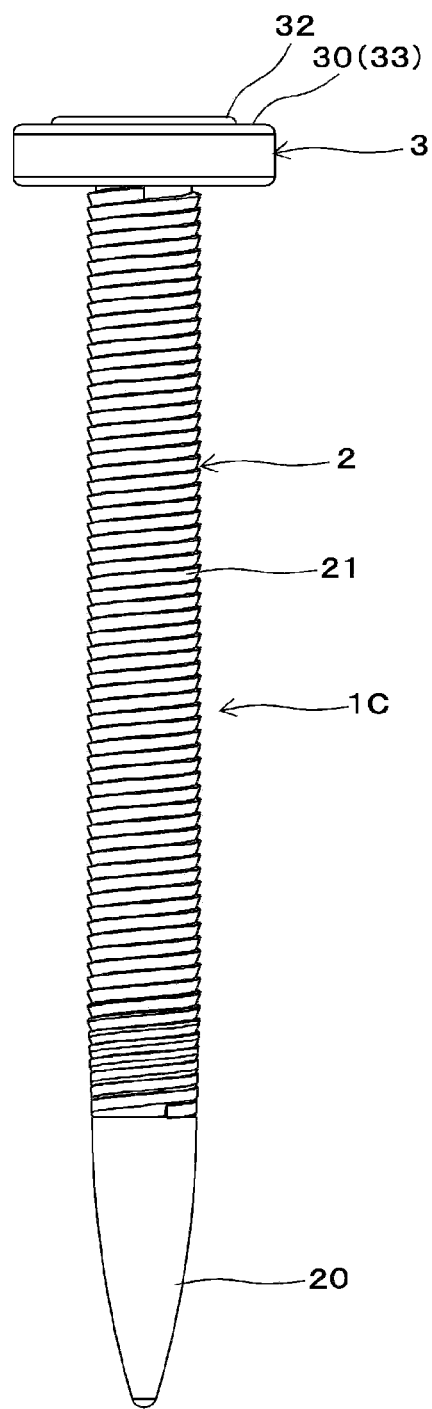
FIG. 4D is a side view showing the example of the screw nail according to the third embodiment.

FIG. 4A is a perspective view showing an example of a screw nail according to a third embodiment, FIG. 4B is a plan view showing the example of the screw nail according to the third embodiment, FIG. 4C is a cross-sectional view taken along an X-X line in FIG. 4B, and FIG. 4D is a side view showing the example of the screw nail according to the third embodiment.

For a screw nail 1C, a convex portion 32 protruding from the end surface 30 of the head portion 3 is continuously formed in the circumferential direction of the head portion 3 up to a region beyond a half region divided by an arbitrary center line on the end surface 30 of the head portion 3. The convex portion 32 may have an annularly continuing shape or a partially notched shape such as a C-shape, as long as a virtual plane tangent to the vertex of the convex portion 32 continuing beyond the half region of the end face 30, which is a virtual plane specified by the vertex of the convex portion 32, has a shape orthogonal to the axis direction of the nail shaft portion 2.

In the case in which the engaging portion 31 is a hole formed in the end face 30 of the head portion 3, the opening exposed on the end face 30 may have a polygonal shape such as a hexagon, or a shape in which a portion between vertexes is concave in a central direction, such as a star shape, in addition to the square shape. The convex portion 32 may be formed at positions facing vertexes of a polygonal shape or a star shape, at positions facing sides between vertexes of a polygonal shape or at positions corresponding to concave portions between vertexes.

Figure 5A:
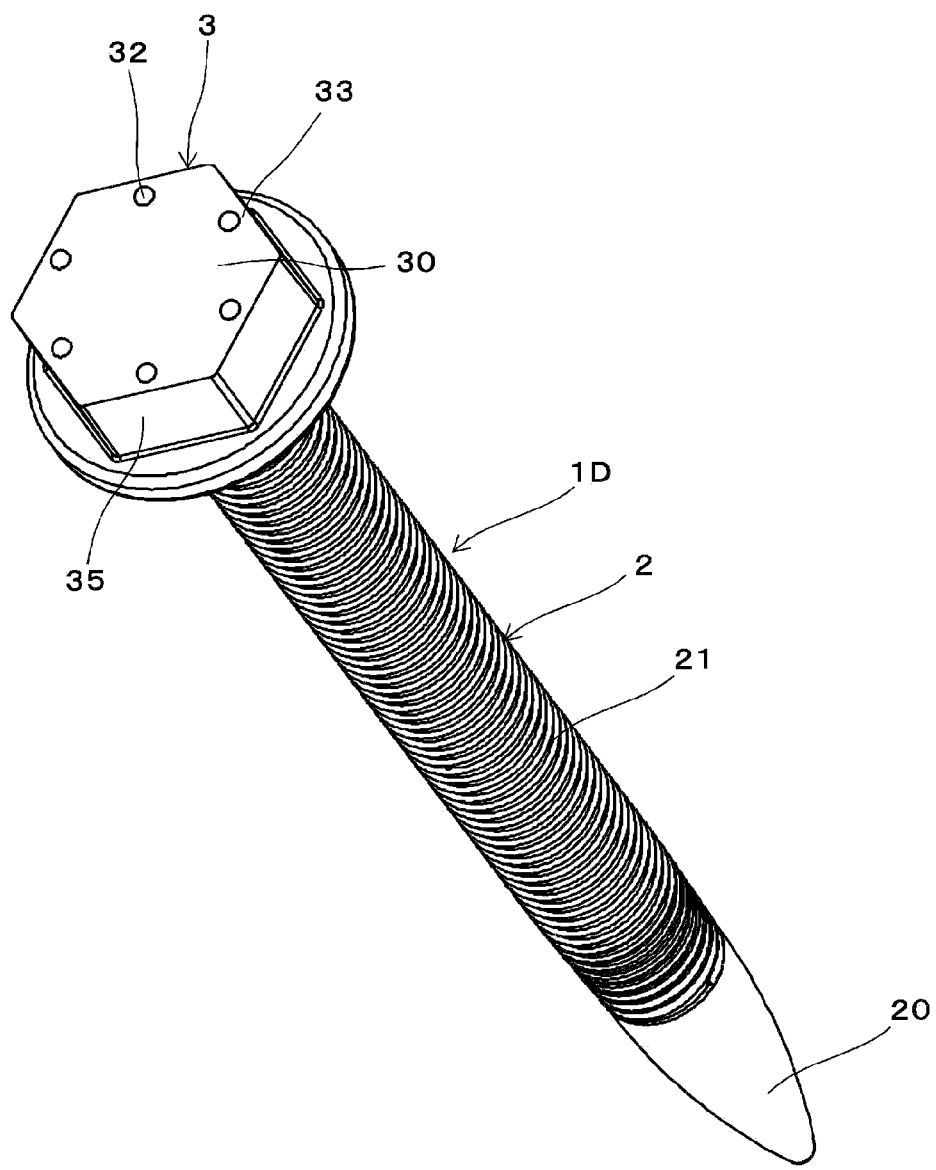
FIG. 5A is a perspective view showing an example of a screw nail according to a fourth embodiment.
Figure 5B:
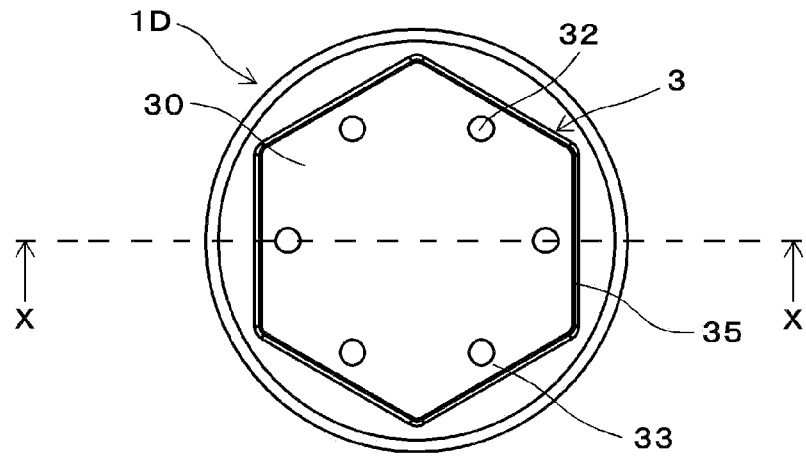
FIG. 5B is a plan view showing the example of the screw nail according to the fourth embodiment.
Figure 5C:
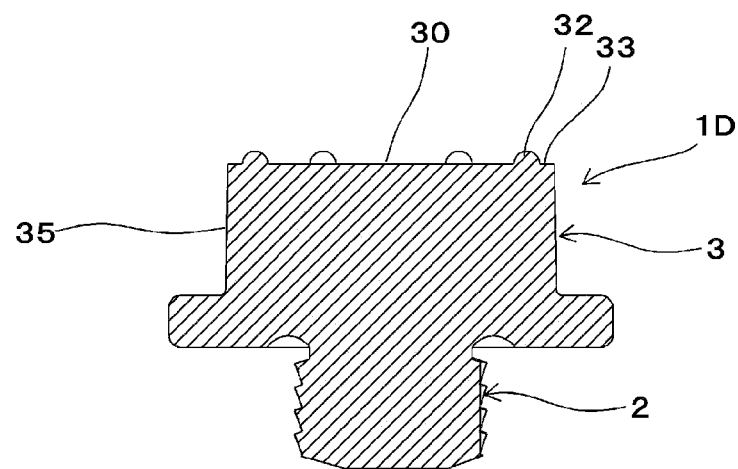
FIG. 5C is a cross-sectional view taken along an X-X line in FIG. 5B.
Figure 5D:
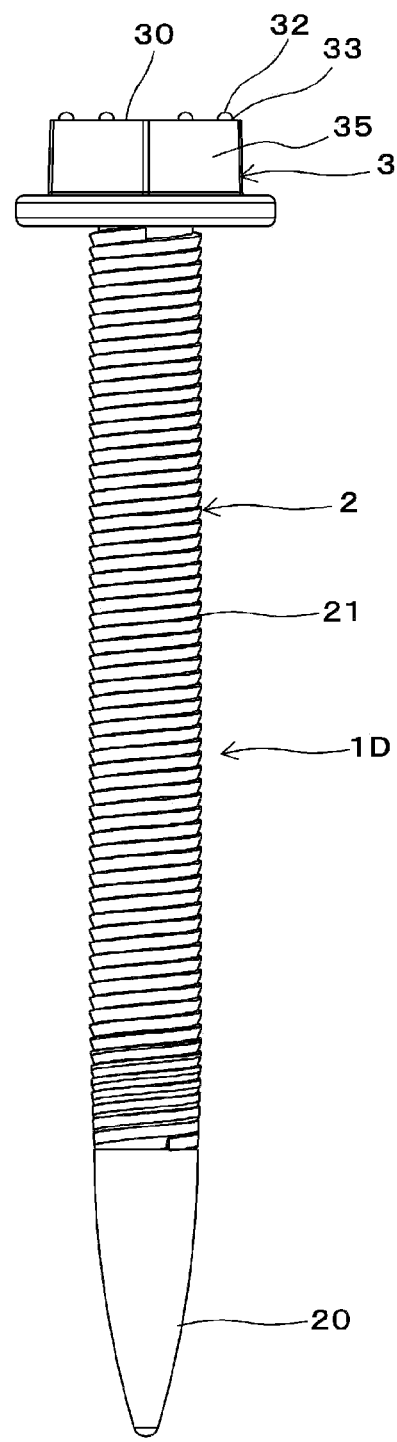
FIG. 5D is a side view showing the example of the screw nail according to the fourth embodiment.

FIG. 5A is a perspective view showing an example of a screw nail according to a fourth embodiment, FIG. 5B is a plan view showing the example of the screw nail according to the fourth embodiment, FIG. 5C is a cross-sectional view taken along an X-X line in FIG. 5B, and FIG. 5D is a side view showing the example of the screw nail according to the fourth embodiment.

Figure 6A:
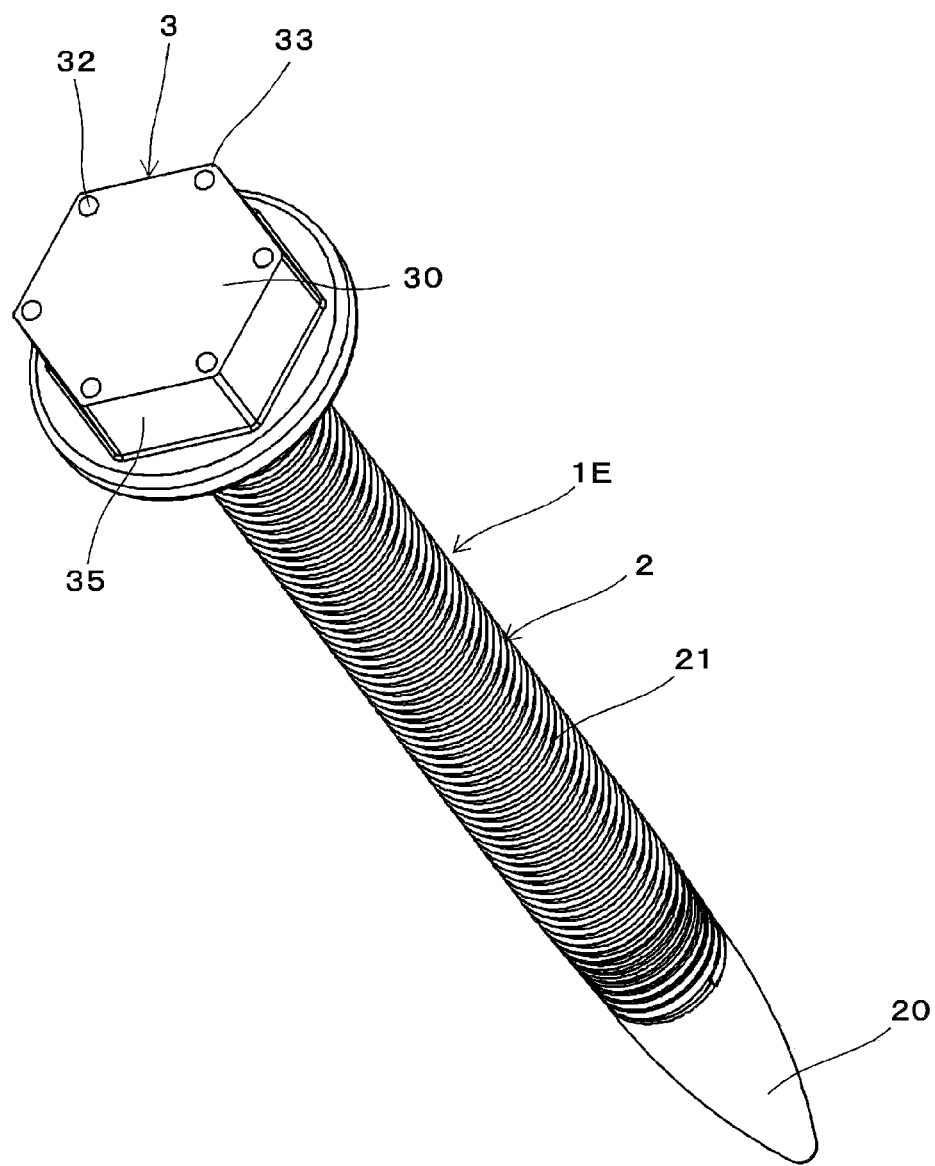
FIG. 6A is a perspective view showing an example of a screw nail according to a fifth embodiment.
Figure 6B:
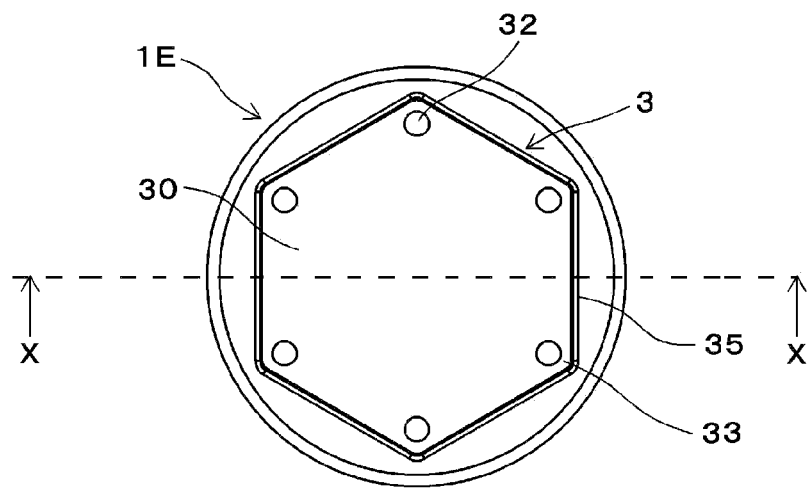
FIG. 6B is a plan view showing the example of the screw nail according to the fifth embodiment.
Figure 6C:
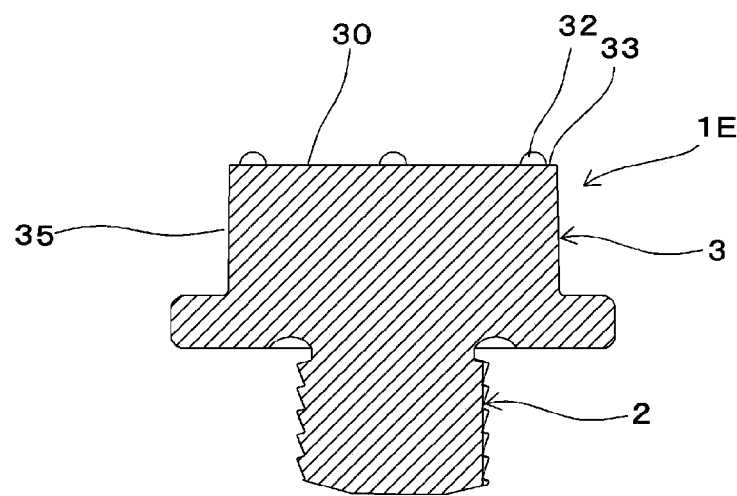
FIG. 6C is a cross-sectional view taken along an X-X line in FIG. 6B.
Figure 6D:
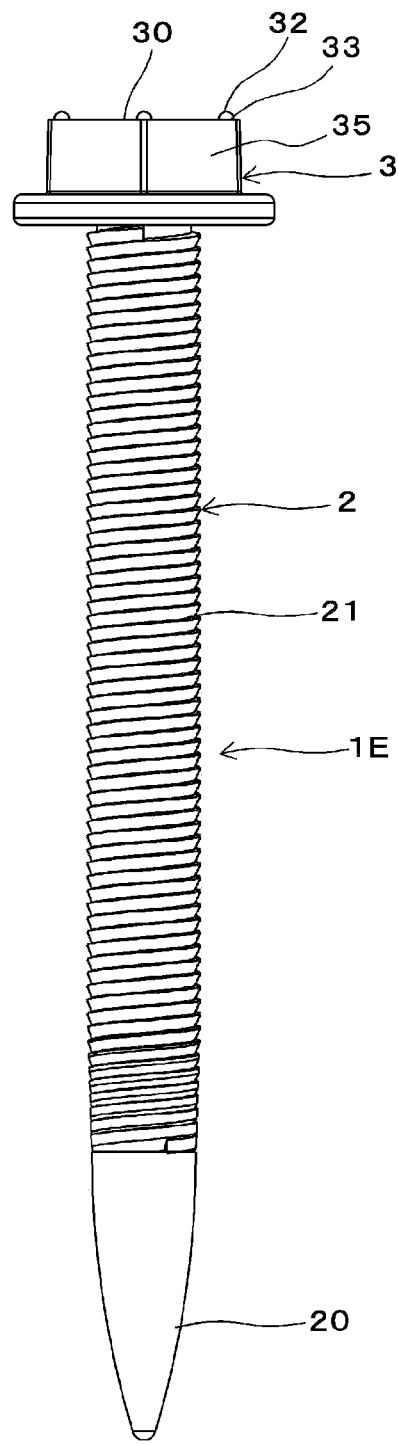
FIG. 6D is a side view showing the example of the screw nail according to the fifth embodiment.

In addition, FIG. 6A is a perspective view showing an example of a screw nail according to a fifth embodiment, FIG. 6B is a plan view showing the example of the screw nail according to the fifth embodiment, FIG. 6C is a cross-sectional view taken along an X-X line in FIG. 6B, and FIG. 6D is a side view showing the example of the screw nail according to the fifth embodiment.

Screw nails 1D and 1E are each formed with an engaging portion 35 serving as a polygonal outer periphery of the head portion 3 and capable of engaging a rotary tool (not shown). The engaging portion 35 has a hexagonal shape in this example. The head portion 3 may be formed, between the engaging portion 35 and the nail shaft portion 2, with a flange portion having a circular shape or the like whose diameter is enlarged in the radial direction with respect to the engaging portion 35.

The screw nails 1D and 1E each have convex portions 32 provided on the end face 30 of the head portion 3 and protruding along the axis direction of the nail shaft portion 2 in the direction opposite to the direction in which the nail shaft portion 2 protrudes from the head portion 3. The screw nail 1D has six convex portions 32 at positions, each facing a side between the vertexes of the polygonal engaging portion 35, on the end face 30 of the head portion 3. In addition, the screw nail 1D is formed with a concave portion 33 outside each convex portion 32 with respect to the radial direction of the head portion 3. The screw nail 1E has six convex portions 32 at positions, each facing each vertex of the polygonal engaging portion 35, on the end face 30 of the head portion 3. In addition, the screw nail 1E is formed with a concave portion 33 outside each convex portion 32 with respect to the radial direction of the head portion 3. In this way, in the configuration in which the engaging portion 35 is formed as the polygonal outer periphery of the head portion 3, the concave portion 33 is formed between the convex portions 32 and the engaging portion 35.

Therefore, even when the convex portions 32 formed on the head portion 3 of each of the screw nails 1D and 1E are deformed by being struck with the striking tool, since the concave portion 33 is formed between the convex portions 32 and the engaging portion 35, the engaging portion 35 is suppressed from being deformed, and a state in which the rotary tool (socket) configured to rotate the screw nails 1D and 1E and the engaging portion 35 of each of the screw nails 1D and 1E can be engaged can be maintained.

Figure 7A:
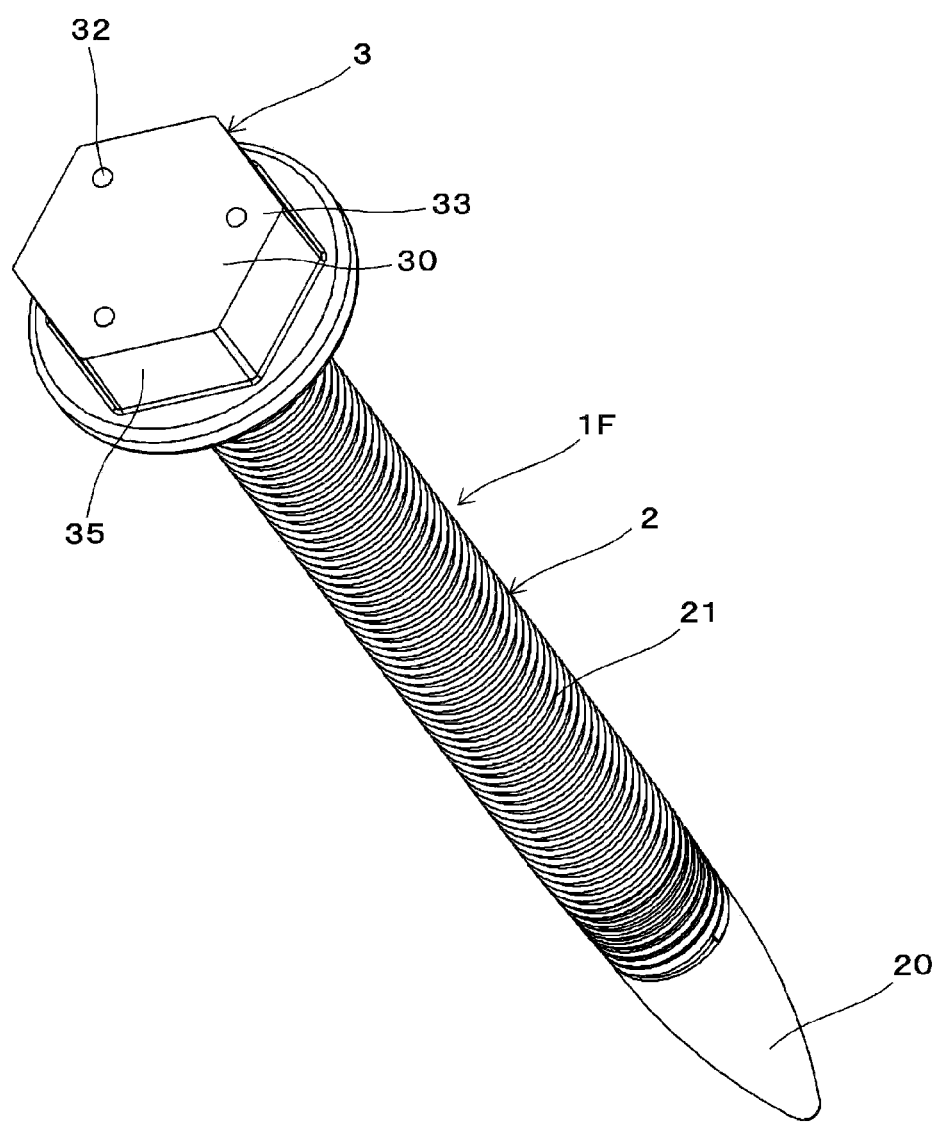
FIG. 7A is a perspective view showing an example of a screw nail according to a sixth embodiment.
Figure 7B:
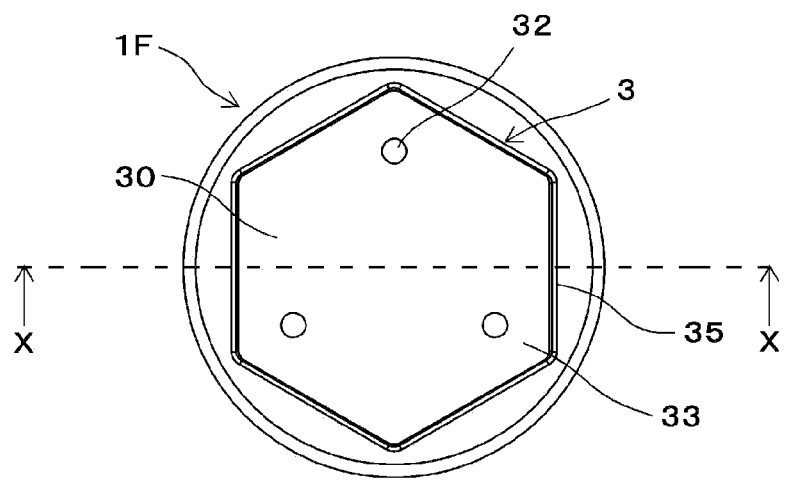
FIG. 7B is a plan view showing the example of the screw nail according to the sixth embodiment.
Figure 7C:
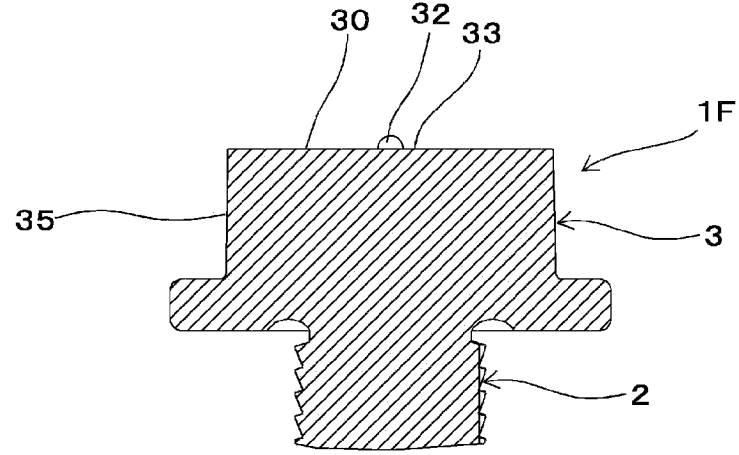
FIG. 7C is a cross-sectional view taken along an X-X line in FIG. 7B.
Figure 7D:
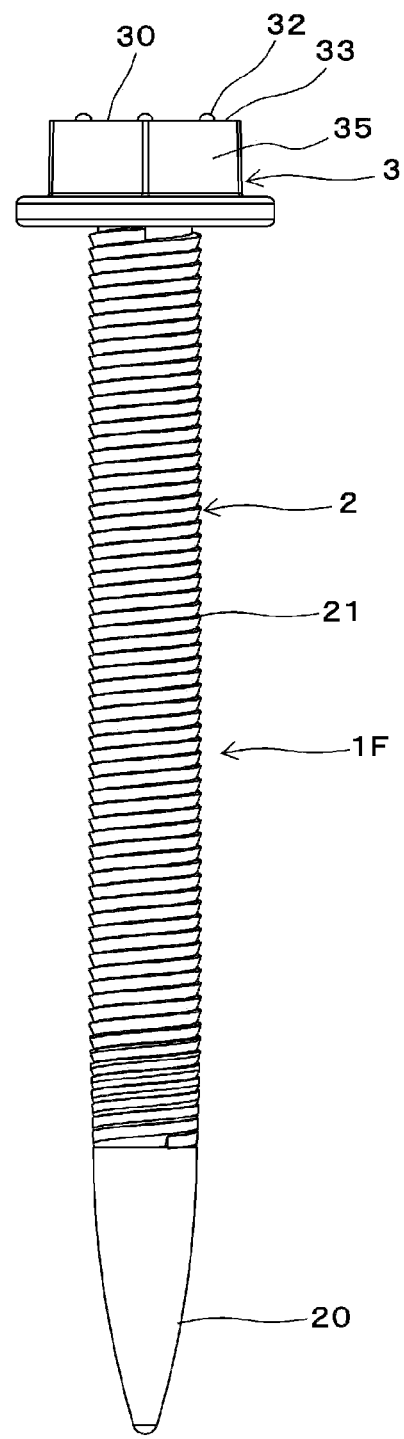
FIG. 7D is a side view showing the example of the screw nail according to the sixth embodiment.

FIG. 7A is a perspective view showing an example of a screw nail according to a sixth embodiment, FIG. 7B is a plan view showing the example of the screw nail according to the sixth embodiment, FIG. 7C is a cross-sectional view taken along an X-X line in FIG. 7B, and FIG. 7D is a side view showing the example of the screw nail according to the sixth embodiment.

A screw nail 1F is formed, on the end face 30 of the head portion 3, with three convex portions 32 at positions facing three vertexes located on an equilateral triangle among vertexes of a hexagonal engaging portion 35, and concave portions 33 between the respective convex portions 32 and the engaging portion 35. In this way, in the case of the screw nail in which the engaging portion 35 is formed as the polygonal outer periphery of the head portion 3, the convex portion 32 may be formed at the position facing a desired side among the sides between the respective vertexes of the polygonal engaging portion 35 or at the position facing a desired vertex among the respective vertexes of the polygonal engaging portion 35.

Figure 8A:
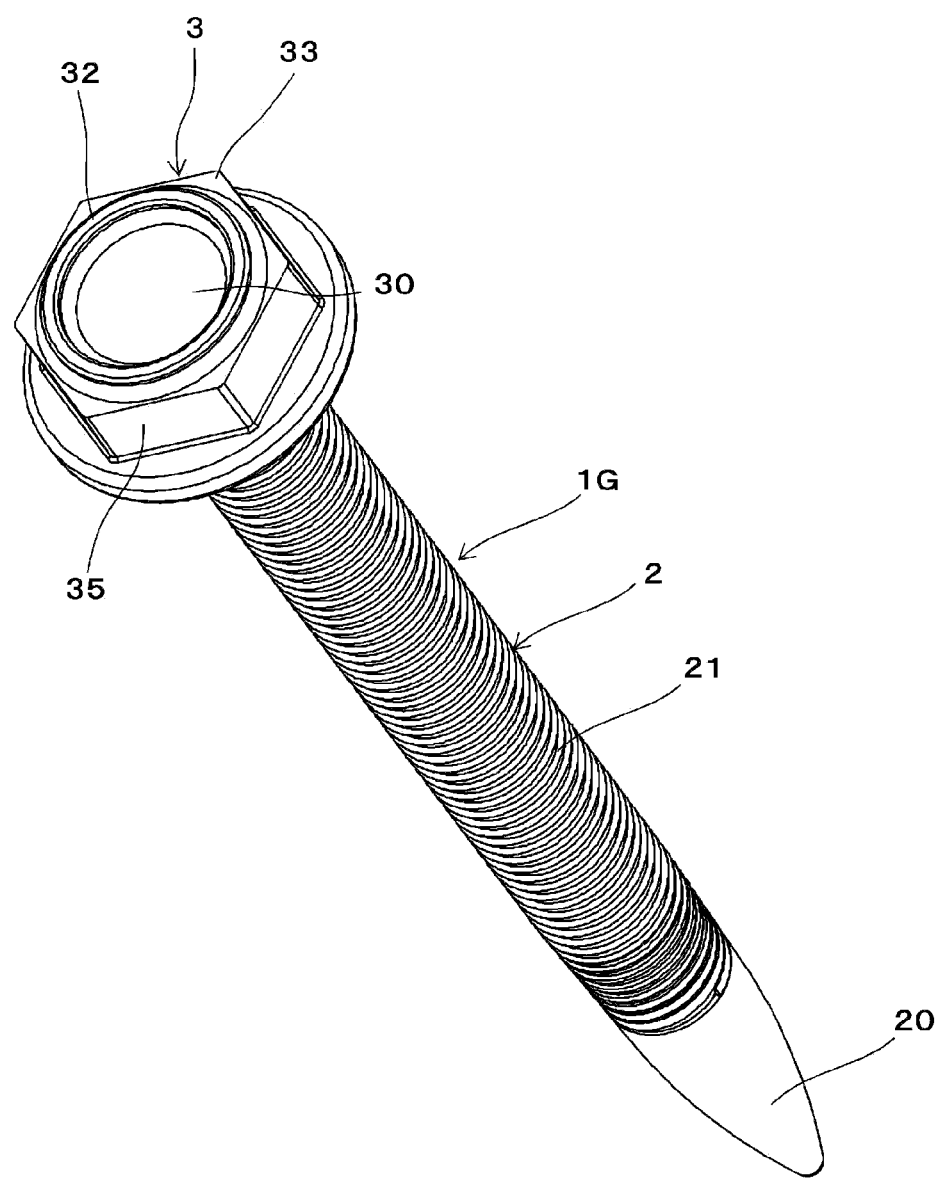
FIG. 8A is a perspective view showing an example of a screw nail according to a seventh embodiment.
Figure 8B:
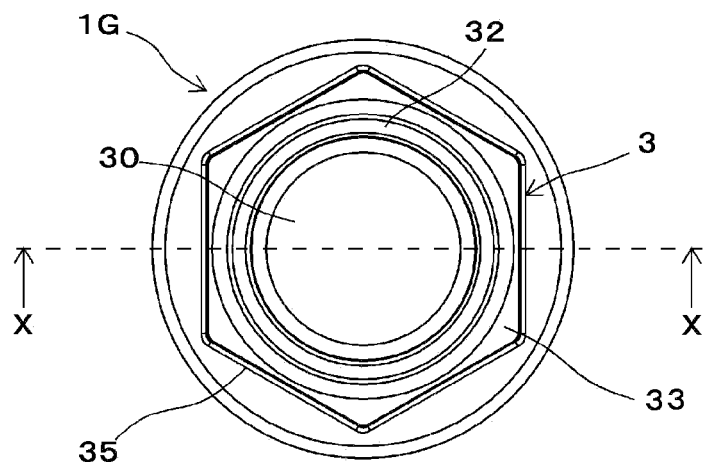
FIG. 8B is a plan view showing the example of the screw nail according to the seventh embodiment.
Figure 8C:
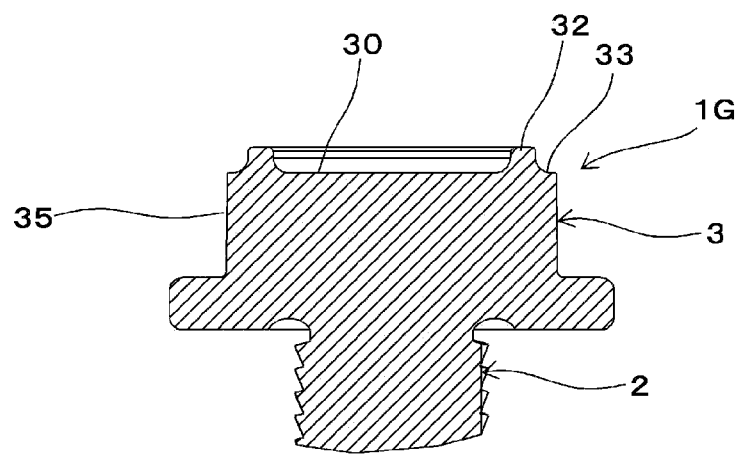
FIG. 8C is a cross-sectional view taken along an X-X line in FIG. 8B.
Figure 8D:
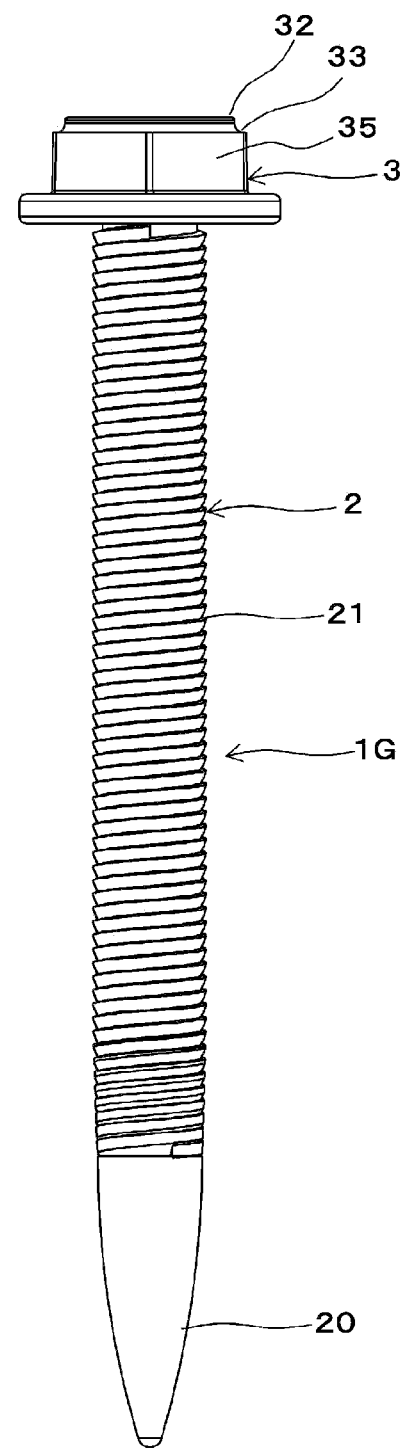
FIG. 8D is a side view showing the example of the screw nail according to the seventh embodiment.

FIG. 8A is a perspective view showing an example of a screw nail according to a seventh embodiment, FIG. 8B is a plan view showing the example of the screw nail according to the seventh embodiment, FIG. 8C is a cross-sectional view taken along an X-X line in FIG. 8B, and FIG. 8D is a side view showing the example of the screw nail according to the seventh embodiment.

A screw nail 1G is formed with an engaging portion 35 serving as the polygonal outer periphery of the head portion 3, and a convex portion 32 protruding from the end surface 30 of the head portion 3 and formed continuously in the circumferential direction of the head portion 3. In addition, the screw nail 1G is formed with a concave portion 33 between the convex portion 32 and the engaging portion 35. The convex portion 32 may have an annularly continuing shape or a partially notched shape such as a C-shape.

Figure 9A:
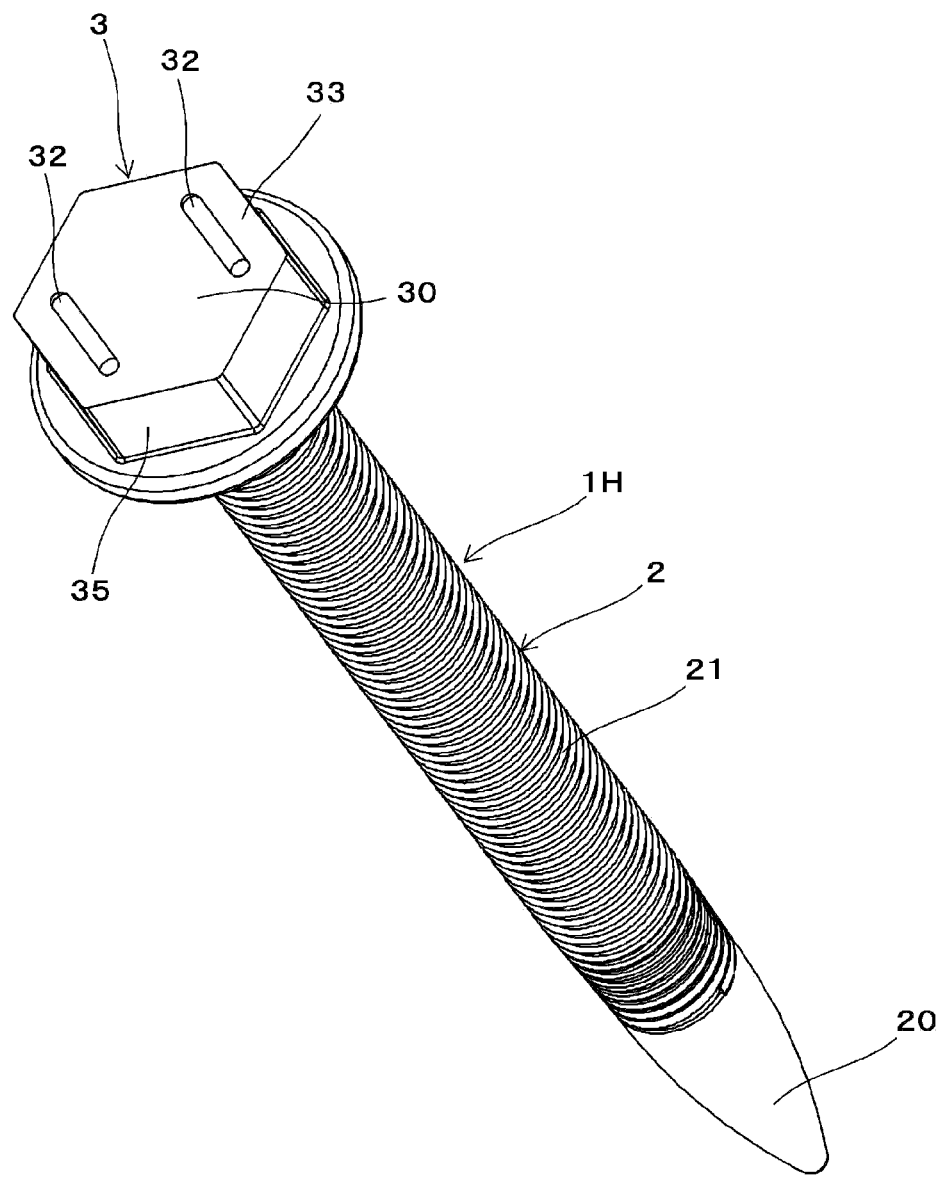
FIG. 9A is a perspective view showing an example of a screw nail according to an eighth embodiment.
Figure 9B:
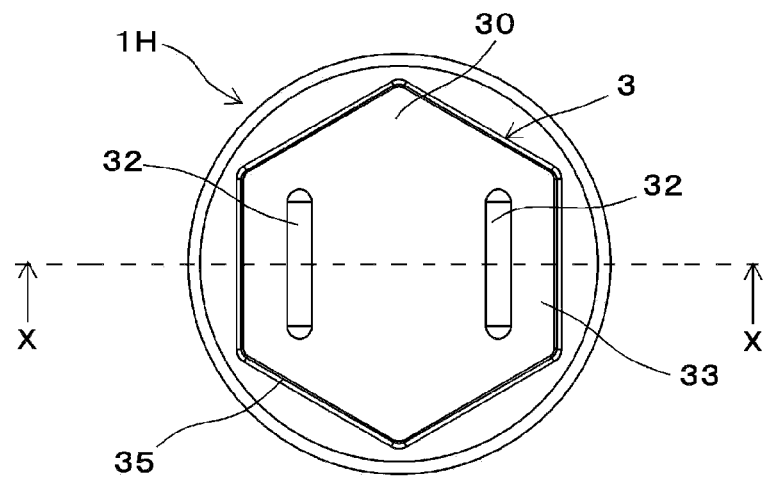
FIG. 9B is a plan view showing the example of the screw nail according to the eighth embodiment.
Figure 9C:
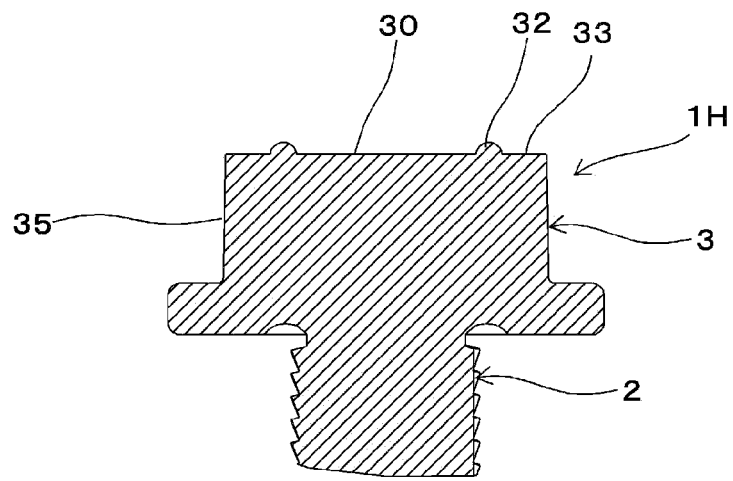
FIG. 9C is a cross-sectional view taken along an X-X line in FIG. 9B.
Figure 9D:
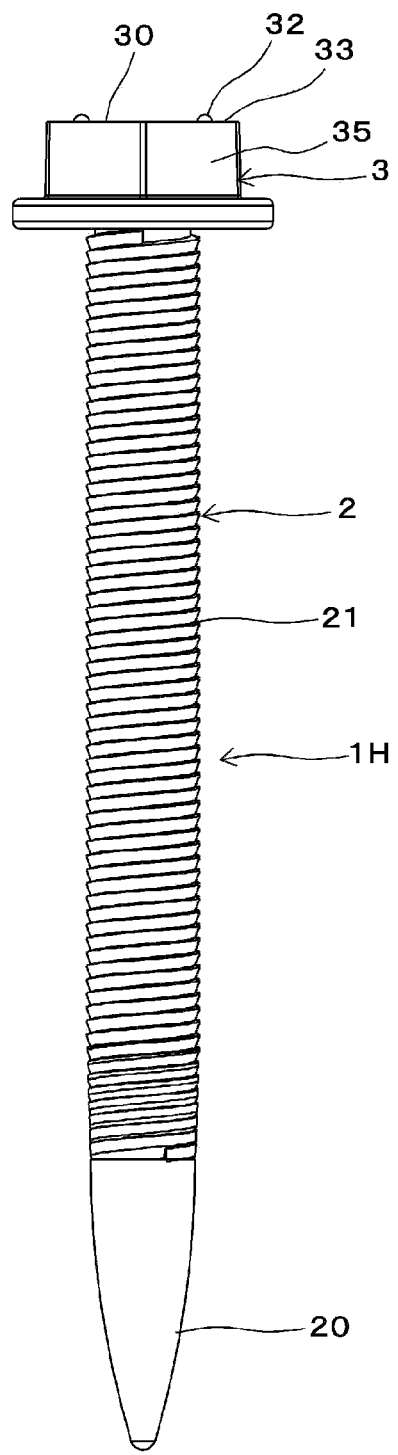
FIG. 9D is a side view showing the example of the screw nail according to the eighth embodiment.

FIG. 9A is a perspective view showing an example of a screw nail according to an eighth embodiment, FIG. 9B is a plan view showing the example of the screw nail according to the eighth embodiment, FIG. 9C is a cross-sectional view taken along an X-X line in FIG. 9B, and FIG. 9D is a side view showing the example of the screw nail according to the eighth embodiment.

A screw nail 1H is formed with an engaging portion 35 serving as the polygonal outer periphery of the head portion 3, and has two convex portions 32 provided on the end face 30 of the head portion 3 and protruding along the axis direction of the nail shaft portion 2 in the direction opposite to the direction in which the nail shaft portion 2 protrudes from the head portion 3. In addition, the screw nail 1H is formed with a concave portion 33 between the convex portion 32 and the engaging portion 35. As long as the convex portions 32 extend along the end face 30 of the head portion 3, are located on both one and the other of half regions divided by an arbitrary center line on the end face 30 of the head portion 3, and are tangential to the striking surface 101 of the screwdriver 100 shown in FIG. 2A and the like in a linear shape and a virtual plane tangent to the vertexes of the convex portions 32 located on both one and the other of the half regions of the end face 30, which is a virtual plane specified by the vertexes of the convex portions 32, is orthogonal to the axis direction of the nail shaft portion 2, the two convex portions 32 may be provided.

Figure 10A:
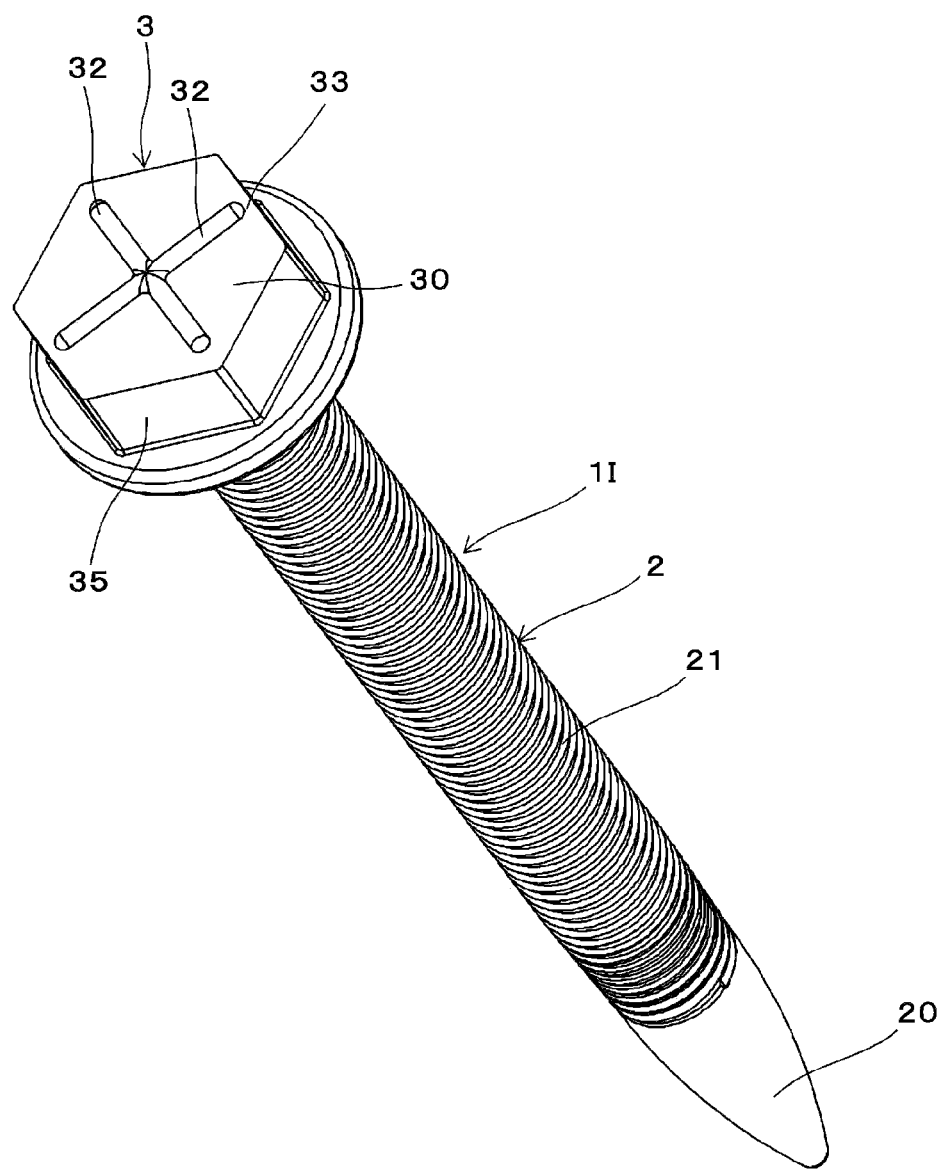
FIG. 10A is a perspective view showing an example of a screw nail according to a ninth embodiment.
Figure 10B:
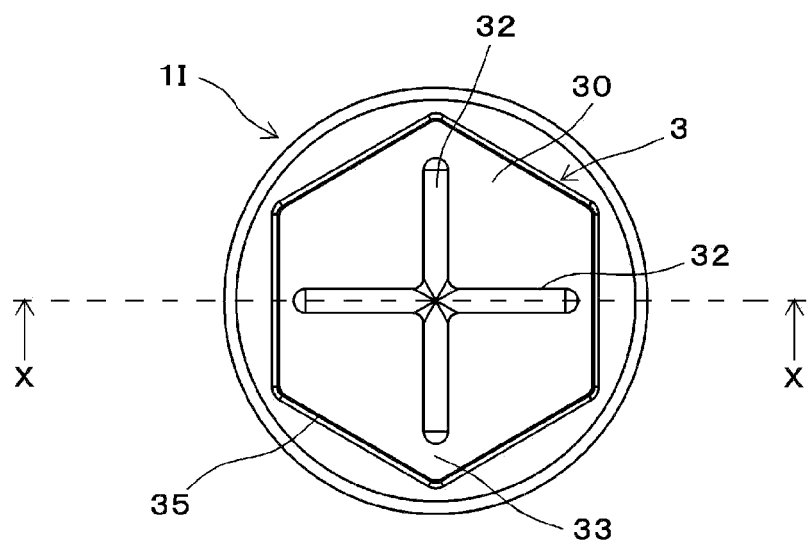
FIG. 10B is a plan view showing the example of the screw nail according to the ninth embodiment.
Figure 10C:
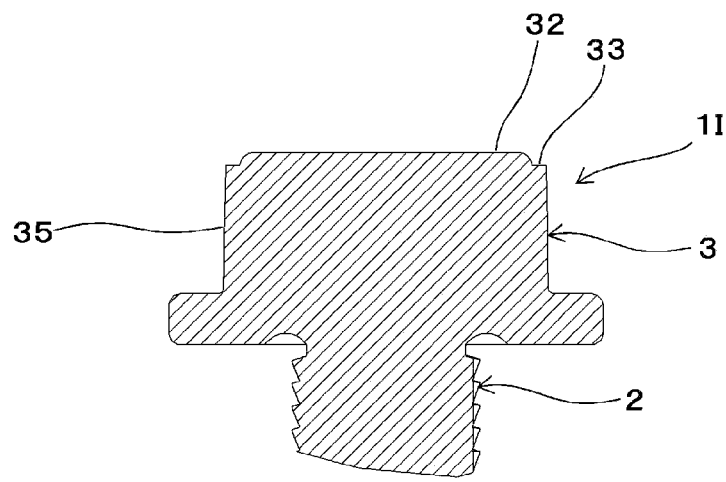
FIG. 10C is a cross-sectional view taken along an X-X line in FIG. 10B.
Figure 10D:
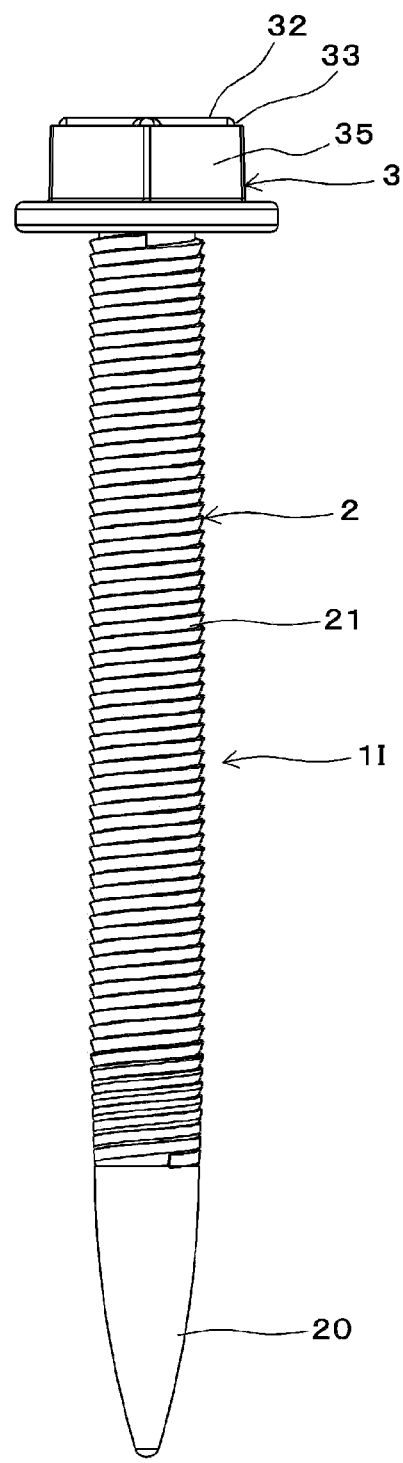
FIG. 10D is a side view showing the example of the screw nail according to the ninth embodiment.

FIG. 10A is a perspective view showing an example of a screw nail according to a ninth embodiment, FIG. 10B is a plan view showing the example of the screw nail according to the ninth embodiment, FIG. 10C is a cross-sectional view taken along an X-X line in FIG. 10B, and FIG. 10D is a side view showing the example of the screw nail according to the ninth embodiment.

A screw nail 1I is formed with an engaging portion 35 serving as the polygonal outer periphery of the head portion 3, and has a convex portion 32 provided on the end face 30 of the head portion 3 and protruding along the axis direction of the nail shaft portion 2 in the direction opposite to the direction in which the nail shaft portion 2 protrudes from the head portion 3. The convex portion 32 is formed in a cross shape, when seeing the end surface 30 of the head portion 3 from the axis direction. In addition, the screw nail 1J is formed with a concave portion 33 between the convex portion 32 and the engaging portion 35. Note that, a center of the cross may be formed with a concave portion.

Figure 11A:
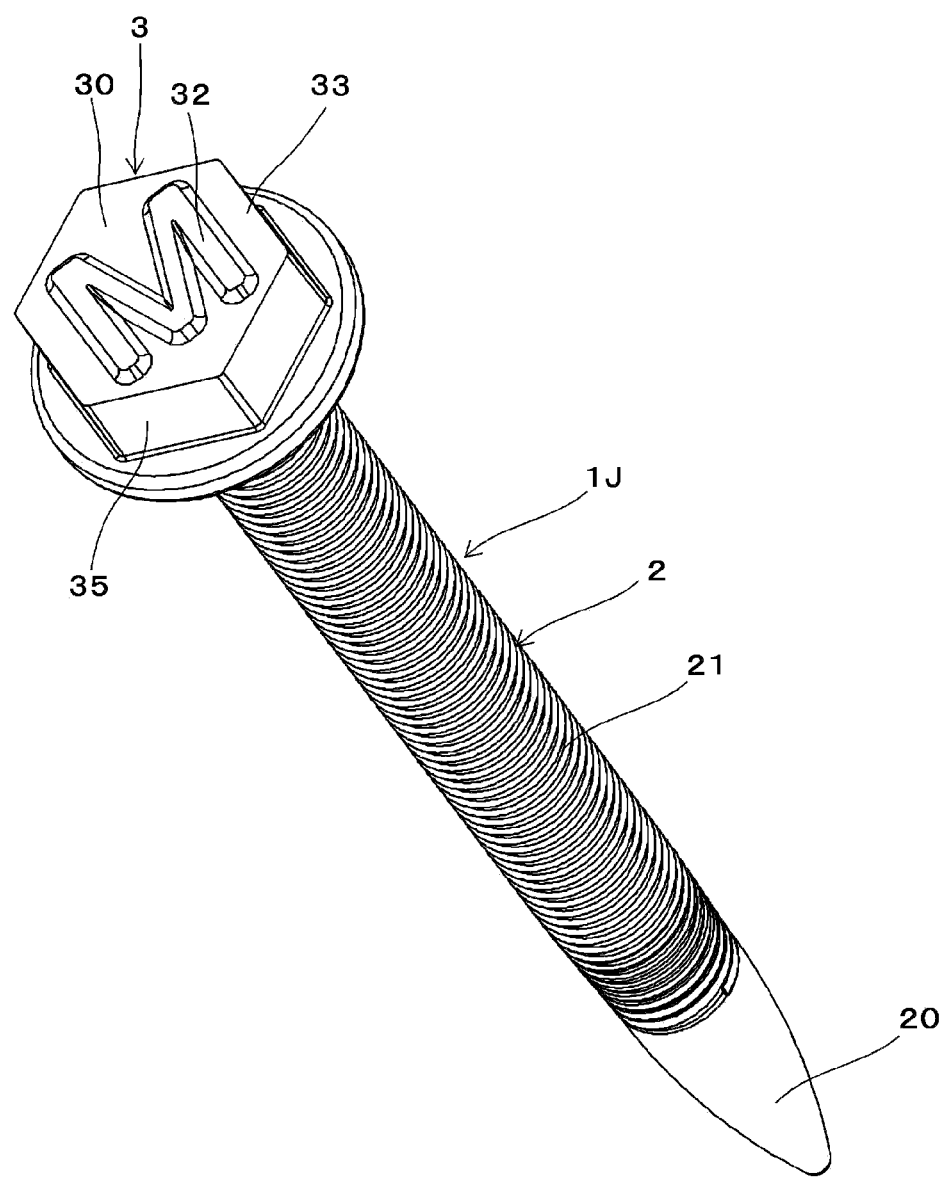
FIG. 11A is a perspective view showing an example of a screw nail according to a tenth embodiment.
Figure 11B:
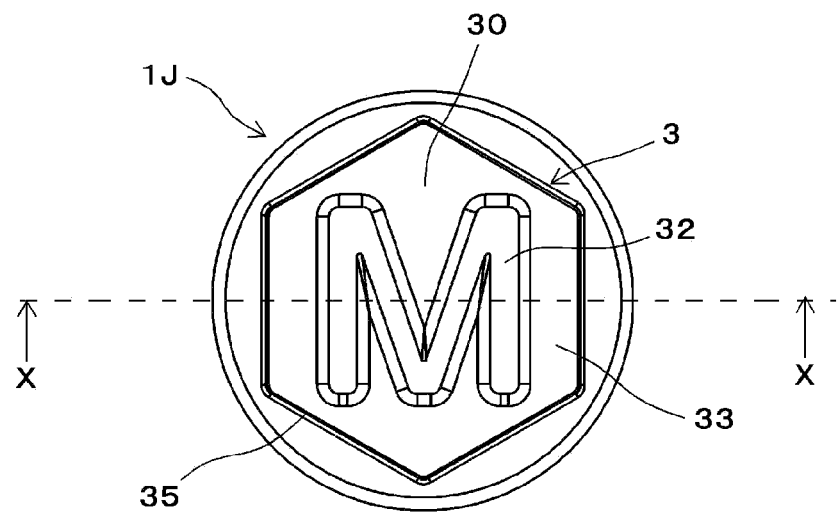
FIG. 11B is a plan view showing the example of the screw nail according to the tenth embodiment.
Figure 11C:
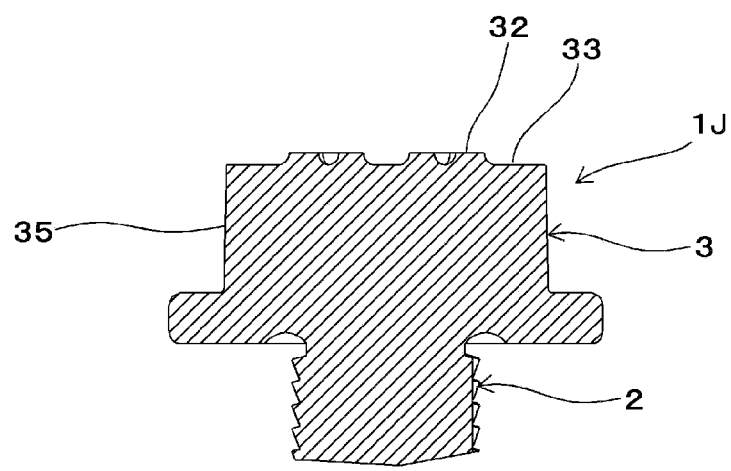
FIG. 11C is a cross-sectional view taken along an X-X line in FIG. 11B.
Figure 11D:
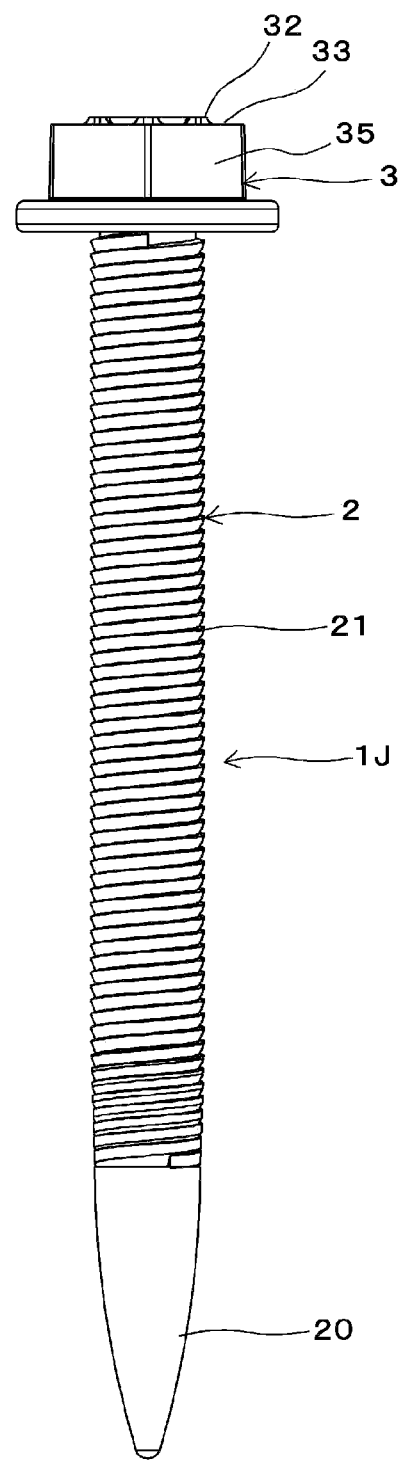
FIG. 11D is a side view showing the example of the screw nail according to the tenth embodiment.

FIG. 11A is a perspective view showing an example of a screw nail according to a tenth embodiment, FIG. 11B is a plan view showing the example of the screw nail according to the tenth embodiment, FIG. 11C is a cross-sectional view taken along an X-X line in FIG. 11B, and FIG. 11D is a side view showing the example of the screw nail according to the tenth embodiment.

A screw nail 1J is formed with an engaging portion 35 serving as the polygonal outer periphery of the head portion 3, and has a convex portion 32 provided on the end face 30 of the head portion 3 and protruding along the axis direction of the nail shaft portion 2 in the direction opposite to the direction in which the nail shaft portion 2 protrudes from the head portion 3. The convex portion 32 is formed in an arbitrary alphabet shape, when seeing the end face 30 of the head portion 3 from the axis direction. In addition, the screw nail 1J is formed with a concave portion 33 between the convex portion 32 and the engaging portion 35. Note that, the alphabet may have a partially notched shape. In addition, a character other than alphabets or a number may also be used.

In this way, in the case of the configuration in which a part of the convex portion 32 is located on one of the half regions divided by an arbitrary center line and the other part of the convex portion 32 is located on the other of the half regions on the end face 30 of the head portion 3, the convex portion 32 comes into contact with a striking tool configured to strike the head portion of the screw nail in each of the half regions divided by the arbitrary center line on the end face 30 of the head portion 3.

In addition, the height of the convex portion 32 is set such that a virtual plane tangent to the vertexes of the convex portion 32, which is a virtual plane specified by the vertexes of the convex portion 32, is orthogonal to the axis of the screw nail. Thereby, in the operation of striking the head portion of the screw nail with the striking tool, the striking tool strikes the convex portion 32, whereby the striking force can be transmitted in the axis direction of the screw nail.

What is claimed is:
1. A screw nail, comprising:
    a nail shaft portion extending along one direction; and
    a head portion, the diameter of the head portion being enlarged along other direction orthogonal to an extension direction of the nail shaft portion, wherein a sharp tip end portion is formed on one end side of the nail shaft portion along the extension direction, and the head portion is formed at an end portion on the other end side, wherein the nail shaft portion is formed with a screw thread between the tip end portion and the head portion, and the head portion is formed with an engaging portion capable of engaging with a rotary tool, wherein a convex portion protruding along an axis direction of the nail shaft portion is formed on an end surface of the head portion on an opposite side to a side from which the nail shaft portion protrudes, wherein a concave portion that is concave with respect to the convex portion along the axis direction of the nail shaft portion is formed between the convex portion and the engaging portion and wherein the concave portion is formed outside the convex portion with respect to a radial direction of the head portion, and wherein a virtual plane specified by vertexes of the convex portion is a plane orthogonal to the axis direction of the nail shaft portion.

2. The screw nail according to claim 1, wherein the convex portion is continuous in a circumferential direction of the head portion up to a region beyond a half region divided by an arbitrary center line on the end surface of the head portion, and a virtual plane tangent to a vertex of the convex portion that is continuous beyond the half region of the end surface is orthogonal to the axis direction of the nail shaft portion.

3. A screw nail, comprising;

a nail shaft portion extending along one direction; and a head portion, the diameter of the head portion being enlarged along other direction orthogonal to an extension direction of the nail shaft portion, wherein a sharp tip end portion is formed on one end side of the nail shaft portion along the extension direction, and the head portion is formed at an end portion on the other end side, wherein the nail shaft portion is formed with a screw thread between the tip end portion and the head portion, and the head portion is formed with an engaging portion capable of engaging with a rotary tool, wherein at least three convex portions protruding along an axis direction of the nail shaft portion are formed on an end surface of the head portion on an opposite side to a side from which the nail shaft portion protrudes, at least one convex portion is located on one of half regions divided by an arbitrary center line and the remaining convex portions are located on the other of the half regions on the end surface of the head portion, wherein a concave portion that is concave with respect to the convex portion along the axis direction of the nail shaft portion is formed between the convex portion and the engaging portion, and wherein a virtual plane tangent to vertexes of the at least three convex portions is orthogonal to the axis direction of the nail shaft portion.

4. The screw nail according to claim 3, wherein the concave portion is formed inside the convex portion with respect to a radial direction of the head portion.

5. The screw nail according to claim 4, wherein the engaging portion is configured by a hole whose opening having at least three vertexes is exposed on the end surface of the head portion, and wherein the convex portion is provided at a position corresponding to a side between respective vertexes of the engaging portion.

6. The screw nail according to claim 5, wherein the convex portion is located on a circumcircle passing through each vertex of the engaging portion.

7. The screw nail according to claim 4, wherein the engaging portion is configured by a hole whose opening having at least three vertexes is exposed on the end surface of the head portion, and wherein the convex portion is located outside a circumcircle passing through each vertex of the engaging portion.

8. A screw nail, comprising;

a nail shaft portion extending along one direction; and a head portion, the diameter of the head portion being enlarged along other direction orthogonal to an extension direction of the nail shaft portion, wherein a sharp tip end portion is formed on one end side of the nail shaft portion along the extension direction, and the head portion is formed at an end portion on the other end side, wherein the nail shaft portion is formed with a screw thread between the tip end portion and the head portion, and the head portion is formed with an engaging portion capable of engaging with a rotary tool, wherein a convex portion protruding along an axis direction of the nail shaft portion is formed on an end surface of the head portion on an opposite side to a side from which the nail shaft portion protrudes, and wherein the convex portions is located on both one and the other of half regions divided by an arbitrary center line, on the end surface of the head portion, the convex portion located on one or both one and the other of the half regions of the end surface extends along the end surface of the head portion, wherein a concave portion that is concave with respect to the convex portion along the axis direction of the nail shaft portion is formed between the convex portion and the engaging portion, wherein a virtual plane specified by vertexes of the convex portion is a plane orthogonal to the axis direction of the nail shaft portion, and a virtual plane tangent to a vertex of the convex portion located on both one side and the other side of the half regions of the end surface is orthogonal to the axis direction of the nail shaft portion.

* * * * *